United States Patent
Kamiyama et al.

(10) Patent No.: US 10,780,473 B2
(45) Date of Patent: Sep. 22, 2020

(54) CEMENT SOLIDIFICATION DEVICE FOR WASTE AND METHOD THEREFOR, AND ZERO-LIQUID DISCHARGE AIR POLLUTION CONTROL SYSTEM AND METHOD THEREFOR

(71) Applicant: MITSUBISHI HITACHI POWER SYSTEMS, LTD., Yokohama-shi, Kanagawa (JP)

(72) Inventors: Naoyuki Kamiyama, Tokyo (JP); Seiji Kagawa, Tokyo (JP); Tetsu Ushiku, Kanagawa (JP); Satoru Sugita, Kanagawa (JP); Toshihiro Fukuda, Kanagawa (JP)

(73) Assignee: MITSUBISHI HITACHI POWER SYSTEMS, LTD., Yokohama-shi, Kanagawa (JP)

( * ) Notice: Subject to any disclaimer, the term of this patent is extended or adjusted under 35 U.S.C. 154(b) by 25 days.

(21) Appl. No.: 15/552,688

(22) PCT Filed: Feb. 25, 2016

(86) PCT No.: PCT/JP2016/055686
§ 371 (c)(1),
(2) Date: Aug. 22, 2017

(87) PCT Pub. No.: WO2016/136903
PCT Pub. Date: Sep. 1, 2016

(65) Prior Publication Data
US 2018/0050302 A1    Feb. 22, 2018

(30) Foreign Application Priority Data

Feb. 27, 2015  (JP) .................................. 2015-039494
Feb. 27, 2015  (JP) .................................. 2015-039495

(51) Int. Cl.
*B09B 1/00*    (2006.01)
*B09B 3/00*    (2006.01)
(Continued)

(52) U.S. Cl.
CPC ............. *B09B 3/0025* (2013.01); *B09B 3/00* (2013.01); *B09B 5/00* (2013.01); *C02F 11/00* (2013.01);
(Continued)

(58) Field of Classification Search
CPC ....................................................... B01D 53/50
See application file for complete search history.

(56) References Cited

U.S. PATENT DOCUMENTS 4,246,242 A * 1/1981 Butler ................... B01D 53/34
                                                            159/4.02
4,397,742 A * 8/1983 Minnick .............. B01D 53/501
                                                            106/705
(Continued)

FOREIGN PATENT DOCUMENTS

JP       52-42469 A      4/1977
JP       3-109984 A      5/1991
(Continued)

OTHER PUBLICATIONS

International Search Report dated Apr. 5, 2016, issued in counterpart International Application No. PCT/JP2016/055686, w/English translation. (5 pages).

(Continued)

Primary Examiner — Janine M Kreck
(74) Attorney, Agent, or Firm — Westerman, Hattori, Daniels & Adrian, LLP

(57) ABSTRACT

A cement solidification device for waste includes a slurrying vessel 14 that dissolves and slurries waste 11 containing harmful substances and deliquescent compounds in solvent (Continued)

water 12 to obtain slurried material 13; an iron-based additive supply unit 16 that adds an iron-based additive 15 to the slurrying vessel 14; a cement kneading vessel 20 that adds a cement solidifying agent 17 from a cement-solidifying agent supply unit 18 to the slurried material 13 in which the iron-based additive 15 is mixed to obtain a cement kneaded product 19; and a cement solidification unit 22 that cures the cement kneaded product 19 to form a cement solidified product 21.

17 Claims, 13 Drawing Sheets

(51) Int. Cl.
*C02F 11/00* (2006.01)
*B09B 5/00* (2006.01)
C02F 1/12 (2006.01)
G21F 9/16 (2006.01)
B01D 1/18 (2006.01)
B01D 53/50 (2006.01)

(52) U.S. Cl.
CPC .............. *B01D 1/18* (2013.01); *B01D 53/50* (2013.01); *B09B 2220/06* (2013.01); *C02F 1/12* (2013.01); *G21F 9/16* (2013.01)

(56) References Cited

U.S. PATENT DOCUMENTS

| | | | |
|---|---|---|---|
| 5,199,377 A * | 4/1993 | Gehrmann, III | C04B 28/04 119/237 |
| 9,700,839 B2 * | 7/2017 | Fukuda | B01D 1/18 |
| 9,895,658 B2 * | 2/2018 | Fukuda | F26B 3/12 |
| 2012/0240761 A1 | 9/2012 | Ukai et al. | |
| 2015/0360174 A1 | 12/2015 | Fukuda et al. | |
| 2015/0375166 A1 | 12/2015 | Fukuda et al. | |

FOREIGN PATENT DOCUMENTS

| | | | |
|---|---|---|---|
| JP | 2003057361 A * | 2/2003 | |
| JP | 2007-117890 A | 5/2007 | |
| JP | 2012-196638 A | 10/2012 | |
| JP | 2013-6144 A | 1/2013 | |
| JP | 2014-50807 A | 3/2014 | |
| JP | 2014-161799 A | 9/2014 | |
| WO | 2014/115854 A1 | 7/2014 | |
| WO | 2014/129030 A1 | 8/2014 | |

OTHER PUBLICATIONS

Translation of Written Opinion dated Apr. 5, 2016, issued in counterpart International Application No. PCT/JP2016/055686. (15 pages).
Extended (Supplementary) Search Report dated Sep. 26, 2018, issued in counterpart European Application No. 16755647.1 (7 pages).
Office Action dated Feb. 12, 2019, issued in counterparrt JP Application No. 2015-039494, with English translation (4 pages).
Office Action dated Apr. 23, 2019, issued in counterparrt JP Application No. 2015-039494, with English translation (4 pages).

* cited by examiner

“CEMENT SOLIDIFICATION DEVICE FOR WASTE AND METHOD THEREFOR, AND ZERO-LIQUID DISCHARGE AIR POLLUTION CONTROL SYSTEM AND METHOD THEREFOR”

FIELD

The present invention relates to a cement solidification device for waste containing heavy metals and deliquescent compounds for example, and a method therefor, and relates to a zero-liquid discharge air pollution control system and a method therefor.

BACKGROUND

Conventionally, as a technique to immobilize heavy metals such as mercury (Hg) contained in a flue gas from an incinerator, immobilization of fly ash recovered by a precipitator that precipitates soot dust in the flue gas with a cement solidifying agent has been developed (Patent Literature 1: Japanese Patent Application Laid-open No. 2007-117890).

Furthermore, a conventional air pollution control system for treating a flue gas discharged from a boiler installed in thermal power generation facilities and the like has been known. The air pollution control system includes a denitration device that removes nitrogen oxides from the flue gas from the boiler, an air heater that recovers heat of the flue gas that passed through the denitration device, a precipitator that removes soot dust in the flue gas after the heat recovery, and a desulfurization device to remove sulfur oxides in the flue gas after the dust removal. As for the desulfurization device, a wet type desulfurization device that removes sulfur oxides in the flue gas by bringing the flue gas into gas-liquid contact with limestone absorbent and the like is generally used.

In recent years, countries have been strengthening regulations on wastewater, and in countries for which more stringent regulations are planned, it is expected that it is difficult to drain the wastewater that contains heavy metals and harmful components into rivers and oceans in the future. Thus, zero-liquid discharge of flue gas treatment devices has been strongly desired and the advent of stably operable zero-liquid discharge treatment devices has been desired.

The present applicant has previously developed, as a device for implementing zero-liquid discharge, a technique that, in a spray drying device that evaporates and exsiccates dehydrated filtrate (hereinafter referred to as "desulfurized effluent") for which gypsum has been separated from absorbent slurry of a wet type desulfurization device, spray-dries the desulfurized effluent with the exhausted heat of the boiler flue gas by bringing it into contact by extracting a partly boiler flue gas (Patent Literature 2: Japanese Patent Application Laid-open No. 2012-196638).

Incidentally, when implementing zero-liquid discharge by partly branching the boiler flue gas from a flue gas duct, and by spraying and evaporating droplets of desulfurized effluent with the exhausted heat thereof, the installation of a spray drying device to completely evaporate the minute droplets of the sprayed desulfurized effluent is indispensable.

In the inside of this spray drying device, evaporated salts that are produced when the minute droplets of the desulfurized effluent are completely evaporated and exsiccated are composed of substances being dissolved in the absorbent of the upstream desulfurization device. The relevant evaporated salts contain a large amount of deliquescent substances such as calcium chloride. When the temperature of the evaporated salts falls below around 100° C. for example, because the evaporated salts, due to the deliquescent behavior thereof, absorb moisture in the surrounding atmosphere and dissolve the moisture, the adhesion is increased and there is such a problem in that the transportability thereof on a conveyor and the like is deteriorated. Furthermore, because the precipitated ash contains the evaporated salts, a precipitation load of the downstream precipitator is increased and there is also a problem in that an increase in the installed capacity of the precipitator is needed.

Thus, the applicant has previously developed a technique in which, by carrying out solid-gas separation from the flue gas by using a solid-content separating device, and immobilizing the solid content, the evaporated salts generated in spraying the desulfurized effluent that was separated from the absorbent slurry by using a gypsum dehydrator are landfilled (Patent Literature 3: WO2014/115854).

Some of the foregoing countries planning to strengthen the regulations are also planning to strengthen, in addition to the wastewater regulations, the regulations on the elution value of each component of landfill waste. In particular, on mercury (Hg), arsenic (As), and selenium (Se) in the landfill controlled substances, the elution regulations at an about 1/10th level of Japan have been proposed in the ministries of environment of the relevant countries.

In particular, in the evaporated salts generated in zero-liquid discharge of desulfurized effluent of a coal combustion boiler, because there is concern that harmful substances such as mercury (Hg), arsenic (As), and selenium (Se) may be eluted from the cement solidified product by the deliquescent behavior of the deliquescent compounds contained in the evaporated salts, there is a problem in that the landfill disposal becomes difficult. Among the foregoing, as a harmful substance for which the value of environmental emission standard contained in the evaporated salts is strict, selenium (Se) can be cited, for example. As the forms of selenium, examples can mainly include selenious acid (hereinafter referred to as tetravalent selenium) and selenic acid (hereinafter referred to as "hexavalent selenium"). In particular, it is known that hexavalent selenium is a very stable substance and the elution prevention is very difficult, and when the waste containing a large amount of hexavalent selenium is the subject and the compliance with the elution regulations is more difficult, a cement solidification technique that is of a higher elution prevention treatment method is needed.

CITATION LIST

Patent Literature

Patent Literature 1: Japanese Laid-open Patent Publication No. 2007-117890
Patent Literature 2: Japanese Laid-open Patent Publication No. 2012-196638
Patent Literature 3: WO2014/115854

SUMMARY

Technical Problem

However, in performing zero-liquid discharge treatment on desulfurized effluent from a desulfurization device that removes sulfur oxides in a flue gas from a coal combustion boiler, when cement solidification treatment is performed at room temperature on evaporated salts having deliquescent properties that are generated in the zero-liquid discharge treatment, in a normal solidification method in which water is added after having mixed the evaporated salts with cement, there is a problem in that heavy metals are likely to be eluted because the moisture oozes out on the surface of the cement solidified product due to the behavior of the deliquescent salts.

Thus, in performing cement solidification on the evaporated salts containing deliquescent compounds together with harmful substances such as heavy metals, so as to prevent the elution of harmful components such as heavy metals on the surface of the cement solidified product while suppressing exudation of moisture by the deliquescent behavior of the evaporated salts, the advent of a cement solidification technique, in which the strength of a cement solidified product becomes higher than an intended strength, has been strongly desired.

Also, the advent of an air pollution control system provided with a cement solidification measure, in which the strength of a cement solidified product is higher than an intended strength, has been strongly desired.

An object of the present invention is, in view of the foregoing problems, to provide a cement solidification device for waste with which the strength of cement solidification is an intended strength and a method therefor.

Furthermore, in view of the foregoing problems, an object of the present invention is to provide a zero-liquid discharge air pollution control system that reliably treats evaporated salts generated when performing zero-liquid discharge on desulfurized effluent from a desulfurization device of the air pollution control system and a method therefor.

Solution to Problem

In order to solve the above-mentioned problems, the first aspect of the invention is a cement solidification device for waste, the cement solidification device including a slurrying vessel that dissolves and slurries waste containing harmful substances and deliquescent compounds in solvent water to obtain slurried material, a cement kneading vessel that adds a cement solidifying agent to slurried material in which an iron-based additive is mixed to obtain a cement kneaded product, an iron-based additive supply unit that adds the iron-based additive to either one or both of the slurrying vessel and the cement kneading vessel, and a cement solidification unit that cures the cement kneaded product to form a cement solidified product.

The second aspect of the invention is the cement solidification device for waste according to the first aspect, wherein the iron-based additive is an inorganic ferrous salt.

The third aspect of the invention is a cement solidification method for waste containing heavy metals and deliquescent compounds, the cement solidification method including dissolving and slurrying waste that contains heavy metals and deliquescent compounds in solvent water to obtain slurried material, adding a cement solidifying agent to slurried material in which an iron-based additive is mixed and that contains heavy metals, followed by kneading, adding the iron-based additive to the slurried material or a cement kneaded product that contains harmful substances and the deliquescent compounds, and curing the cement kneaded product in which the cement solidifying agent is mixed to form a cement solidified product.

The fourth aspect of the invention is the cement solidification method for waste according to the third aspect, wherein the iron-based additive is an inorganic ferrous salt.

The fifth aspect of the invention is a zero-liquid discharge air pollution control system, including a boiler that combusts fuel, a heat recovery device that is provided on a main flue gas duct discharging a boiler flue gas from the boiler and recovers heat of the boiler flue gas, a precipitator that removes soot dust in the boiler flue gas after the heat recovery device, a desulfurization device that removes sulfur oxides contained in the boiler flue gas after the precipitator with a desulfurization absorbent, a solid-liquid separator that removes solid material from desulfurized effluent discharged from the desulfurization device, a spray drying device that sprays separated water from the solid-liquid separator, a gas introduction line that introduces into the spray drying device a drying gas for evaporating and drying the separated water, a discharged-gas supply line that returns to the main flue gas duct a discharged gas after evaporating and drying the separated water by the spray drying device, an evaporated salt separator that is provided on the discharged-gas supply line and separates an evaporated salt containing harmful substances and deliquescent compounds in the discharged gas, a slurrying vessel that dissolves and slurries the evaporated salt that has been separated by the evaporated salt separator in solvent water to obtain slurried material, a cement kneading vessel that adds a cement solidifying agent to the slurried material to obtain a cement kneaded product, an iron-based additive supply unit that adds an iron-based additive to either one or both of the slurrying vessel and the cement kneading vessel, and a cement solidification unit that cures the cement kneaded product to form a cement solidified product.

The sixth aspect of the invention is the zero-liquid discharge air pollution control system according to the fifth aspect, wherein the solvent water is a part of the separated water that has been separated by the solid-liquid separator.

The seventh aspect of the invention is the zero-liquid discharge air pollution control system according to the fifth aspect, wherein fly ash is added to the cement kneading vessel together with the cement solidifying agent.

The eighth aspect of the invention is the zero-liquid discharge air pollution control system according to the fifth aspect, wherein a dry additive is added to a branched gas.

The ninth aspect of the invention is the zero-liquid discharge air pollution control system according to the eighth aspect, wherein after the evaporated salt to which the dry additive is added is separated by the evaporated salt separator, a part of the evaporated salt is added to the branched gas.

The tenth aspect of the invention is the zero-liquid discharge air pollution control system according to the fifth aspect, further including a dissolved-component measuring device that measures dissolved components in the separated water that has been separated by the solid-liquid separator, wherein an addition amount of either one or both of the iron-based additive and the cement solidifying agent is adjusted, depending on a value of the measured dissolved components.

The eleventh aspect of the invention is the zero-liquid discharge air pollution control system according to tenth aspect, further including an elution-component measuring device that measures elution components in the cement solidified product, wherein an addition amount of either one or both of the iron-based additive and the cement solidifying agent is adjusted depending on a value of the measured elution components.

The twelfth aspect of the invention is the zero-liquid discharge air pollution control system according to the fifth aspect, further including an oxidation-reduction potential meter that measures an oxidation-reduction potential value of the desulfurization absorbent in the desulfurization device, wherein an oxidation-reduction potential is adjusted to a range of 100 to 200 mV.

The thirteenth aspect of the invention is a zero-liquid discharge air pollution control method including recovering heat of a boiler flue gas from a boiler, removing sulfur oxides contained in the boiler flue gas with a desulfurization absorbent, removing solid material from desulfurized effluent discharged at the removing of sulfur oxides, and spraying separated water that has been separated at the removing of the solid material and evaporating and drying the separated water with a drying gas, the zero-liquid discharge air pollution control method including separating, into solid and gas, an evaporated salt containing harmful substances and deliquescent compounds in discharged gas after the spraying and the drying, dissolving and slurrying the evaporated salt that has been separated after the separating of the evaporated salt in solvent water to obtain slurried material, adding a cement solidifying agent after the slurrying, followed by kneading, curing a cement kneaded product after the adding and the kneading to form a cement solidified product, and adding an iron-based additive to the slurried material or the cement kneaded product at least one of the slurrying and the adding the cement solidifying agent.

The fourteenth aspect of the invention is the zero-liquid discharge air pollution control method according to the thirteenth aspect, wherein the solvent water is a part of the separated water that has been separated from the desulfurized effluent.

The fifteenth aspect of the invention is the zero-liquid discharge air pollution control method according to the thirteenth aspect, wherein fly ash is added together with the cement solidifying agent to obtain the cement kneaded product.

The sixteenth aspect of the invention is the zero-liquid discharge air pollution control method according to the thirteenth aspect, wherein a dry additive is added to a branched gas.

The seventeenth aspect of the invention is the zero-liquid discharge air pollution control method according to the sixteenth aspect, wherein after the evaporated salt to which the dry additive is added is separated by the evaporated salt separator, a part of the evaporated salt is added to the branched gas.

The eighteenth aspect of the invention is the zero-liquid discharge air pollution control method according to the thirteenth aspect, wherein dissolved components in the separated water that has been separated by the solid-liquid separator are measured, and an addition amount of either one or both of the iron-based additive and the cement solidifying agent is adjusted depending on a value of the measured dissolved components.

The nineteenth aspect of the invention is the zero-liquid discharge air pollution control method according to the eighteenth aspect, wherein elution components in the cement solidified product are measured, and an addition amount of either one or both of the iron-based additive and the cement solidifying agent is adjusted depending on a value of the measured elution components.

The twenties aspect of the invention is the zero-liquid discharge air pollution control method according to the thirteenth aspect, wherein an oxidation-reduction potential value of the desulfurization absorbent in the desulfurization device is measured, and the oxidation-reduction potential is adjusted to a range of 100 to 200 mV.

Advantageous Effects of Invention

According to the present invention, after obtaining the slurried material first in the slurrying vessel, by adding and kneading the cement solidifying agent to the slurried material in the cement kneading vessel, it is possible to increase the solidification strength of the cement solidified product.

According to the present invention, in carrying out the zero-liquid discharge treatment by spray drying the desulfurized effluent, when the cement solidification treatment is subsequently carried out on the evaporated salts that contain harmful substances and deliquescent compounds and are generated in drying, because the cement solidification treatment is carried out by supplying the cement solidifying agent after the slurried material is once obtained, it is possible to obtain the cement solidified product of high compressive strength. As a result, when carrying out the landfill disposal of the cement solidified product separately, because the immobilizing treatment has been carried out, it is possible to carry out the landfill disposal of the cement solidified product that satisfies the environmental emission standards.

DESCRIPTION OF EMBODIMENTS

With reference to the accompanying drawings, the following describes exemplary preferred embodiments of the present invention in detail. Note that the invention is not limited by the embodiments and, when there are a plurality of embodiments, it includes those configured by combining the respective embodiments.

First Embodiment

Figure 1:
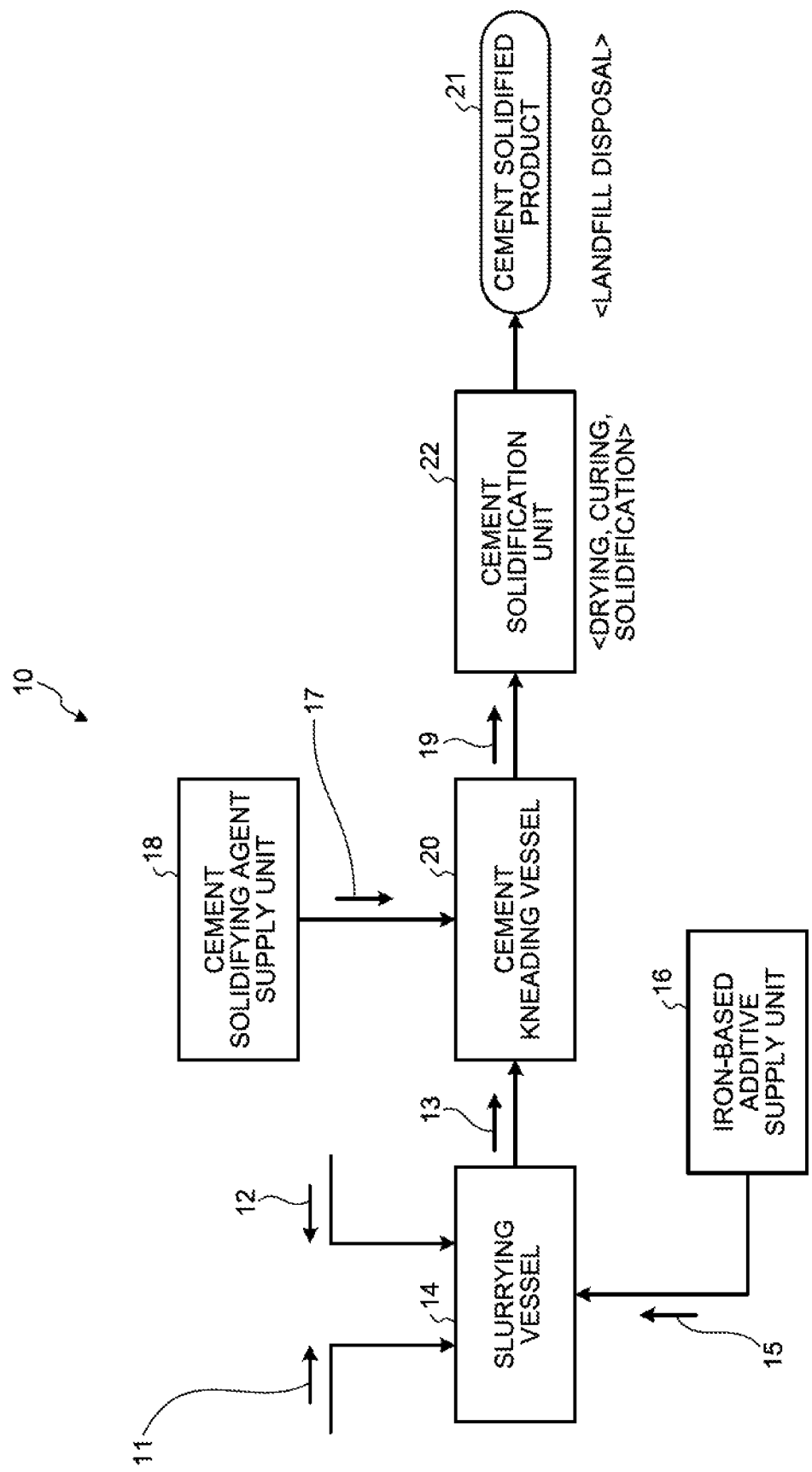
FIG. 1 is a schematic diagram of a cement solidification device for waste according to a first embodiment.

FIG. 1 is a schematic diagram of a cement solidification device for waste according to a first embodiment.

As illustrated in FIG. 1, a cement solidification device 10 for waste in the first embodiment includes a slurrying vessel 14 that dissolves and slurries waste 11 containing harmful substances and deliquescent compounds in solvent water 12 to obtain slurried material 13; an iron-based additive supply unit 16 that adds an iron-based additive 15 into the slurrying vessel 14; a cement kneading vessel 20 that adds a cement solidifying agent 17 from a cement-solidifying agent supply unit 18 to the slurried material 13 in which the iron-based additive 15 is mixed to obtain a cement kneaded product 19; and a cement solidification unit 22 that dries and cures and then solidifies the cement kneaded product 19 to form a cement solidified product 21.

The waste 11 that is an object of cement solidification treatment in the first embodiment contains harmful substances such as heavy metals (for example, mercury (Hg), selenium (Se), and arsenic (As)), and together with the harmful substances, contains deliquescent compounds. The heavy metals mean metals having a specific gravity of four or greater, and the examples thereof may include lead (Pb), cadmium (Cd), chrome (Cr), manganese (Mn), cobalt (Co), nickel (Ni), copper (Cu), zinc (Zn), bismuth (Bi), and iron (Fe), in addition to mercury (Hg) and selenium (Se), for example.

Examples of the waste 11 that is the object of this treatment include, but not limited to, precipitated fly ash from a precipitator of a garbage incineration system, concentrate in a zero-liquid discharge process of wastewater treatment from a garbage incineration system, concentrate in a zero-liquid discharge process of mine wastewater treatment, mixed concentrate of waste and wastewater from nuclear power generation equipment, and concentrate (evaporated salts) at the time of zero-liquid discharge of desulfurized effluent from a desulfurization device of coal-combustion boiler equipment, for example.

The waste of the object of this treatment contains, in addition to harmful substances, deliquescent compounds. The deliquescent compounds mean the substances that exhibit a phenomenon that the solid absorbs moisture in the air and the solid dissolves into the moisture, when the solid of the deliquescent compounds is left in the atmosphere. As general deliquescent compounds, the examples thereof may include calcium chloride ($CaCl_2$), sodium hydroxide (NaOH), and magnesium chloride ($MgCl_2$), for example.

As the cement solidifying agent 17 for solidifying cement, $3CaO.SiO_2$, $3CaO.Al_2O_3$, and the like are blended, for example, and that makes the immobilization of harmful components in waste more reliable. As the cement solidifying agent, Portland cement and the like may be exemplified, for example. Furthermore, together with the cement solidifying agent, fly ash and others may be added.

When waste is solidified in cement according to a conventional technology, carried out is the cement solidification treatment in which the solid of waste and the cement solidifying agent 17 are mixed together in a powder (solid) state, are kneaded while adding a certain moisture, are dried, and then are solidified.

However, in the case where the waste 11 contains deliquescent compounds, in the conventionally carried out mixing method that mixes the evaporated salts and cement together and adds water, the compressive strength (crushing strength) of the cement solidified product obtained does not reach an intended standard value. Thus, when the cement solidified product is landfilled over a long period of time, there are problems that the cement solidified product is cracked and that the deliquescent compounds ooze out on the surface of the cement solidified product.

Moreover, when the moisture oozes out on the surface of the cement solidified product 21 along with the deliquescent behavior of the deliquescent compounds, the moisture may be accompanied with the harmful substances of the inside of the cement solidified product 21 and the harmful substances may leak to the outside. As a result, in carrying out the landfill disposal over a long period of time, when it contains the harmful substances of extremely low environmental emission standard values or the harmful substances for which the environmental emission standard values become stricter in the future, it may be no longer possible to carry out the landfill disposal as it is.

Thus, in the first embodiment, in the slurrying vessel 14, the treatment of dissolving and slurrying the waste 11 in the solvent water 12 is carried out first, and the slurried material 13 with the solvent water 12 is to be obtained. In the slurried material 13 obtained in the slurrying process, the dispersion and homogenization of the harmful substances in the waste 11 are achieved by the behavior of the solvent water 12.

That is, in the slurrying vessel 14, by gradually putting solids of the waste 11 into the solvent water 12, by stirring it with a stirring device (not depicted) or the like, and by obtaining the slurried material 13 in suspension form in which liquid and solid are mixed, the treatment of solid-liquid mixing and dispersion promotion is carried out, thereby facilitating the homogenization of the subsequent kneading treatment with the cement solidifying agent 17.

As just described, in the first embodiment, without kneading the waste 11 and the cement solidifying agent 17 as is in a solid state, after obtaining the slurried material 13 in the slurrying vessel 14 first, the kneading treatment with the cement solidifying agent 17 is carried out in the cement kneading vessel 20, and thus the solidification strength of the cement solidified product 21 is thereby increased. This promotes the dispersion in obtaining the slurried material 13. Accordingly, in operation of homogeneous mixing of the cement solidifying agent 17 into the slurried material 13 containing heavy metals, the cement solidifying agent 17 is homogenized in the slurry and the solidification strength is likely to increase. As a result, the solidification with a smaller amount of cement is possible, as compared with when the relevant slurrying treatment is not carried out.

Along with an increase in the cement solidification strength, the exudation of the deliquescent compounds is also reduced. As a result, because it is possible to reduce the amount of harmful substances that ooze out to the outside accompanying the deliquescent compounds, even when the landfill disposal is carried out over a long period of time, it is possible to obtain the cement solidified product 21 that satisfies the environmental emission standards.

When obtaining the slurried material 13, a divalent iron-based chemical agent is added as the iron-based additive 15 so that the hydration reaction in the cement solidification treatment by the cement solidifying agent 17 and the ferrite reaction by the divalent iron-based chemical agent are carried out, such that the hydration reaction progresses in a homogeneously mixed state in the slurry and the harmful substances are easily taken into the inside of the hydration reaction solid solution crystal of the cement and immobilized.

In the first embodiment, the iron-based additive 15 is added into the slurrying vessel 14 from the iron-based additive supply unit 16. However, the present invention is not limited thereto, and the iron-based additive 15 may be added to either one or both of the slurrying vessel 14 and the cement kneading vessel 20 from the iron-based additive supply unit 16.

As for the divalent iron-based chemical agent, examples may include ferrous chloride ($FeCl_2$), ferrous sulfate ($FeSO_4$), iron nitrate ($Fe(NO_3)_2$), iron carbonate ($FeCO_3$), iron iodide ($FeI_2$), and iron fluoride ($FeF_2$), for example. However, the present invention is not limited thereto.

As for the compressive strength (crushing strength) of the cement solidified product thus obtained, it is preferable to be 150 kg/cm$^2$ or greater, more preferably 200 kg/cm$^2$ or greater, for example. The compressive strength can be an indicator indicating that the elution concentration is satisfied, by grasping beforehand the relation between the concentration of heavy metals contained in the waste 11 and a target elution concentration of the cement solidified product 21 when operating the cement solidification treatment and by periodically checking the target compressive concentration when the cement solidification is carried out on the same waste 11. The compression strength is set in accordance with the elution standards. Thus, when the concentration of harmful heavy metals contained in the waste 11 becomes high or the elution regulation values of the relevant heavy metals become stringent, it is desirable to operate it with a high cement compressive strength as the indicator.

Figure 2:
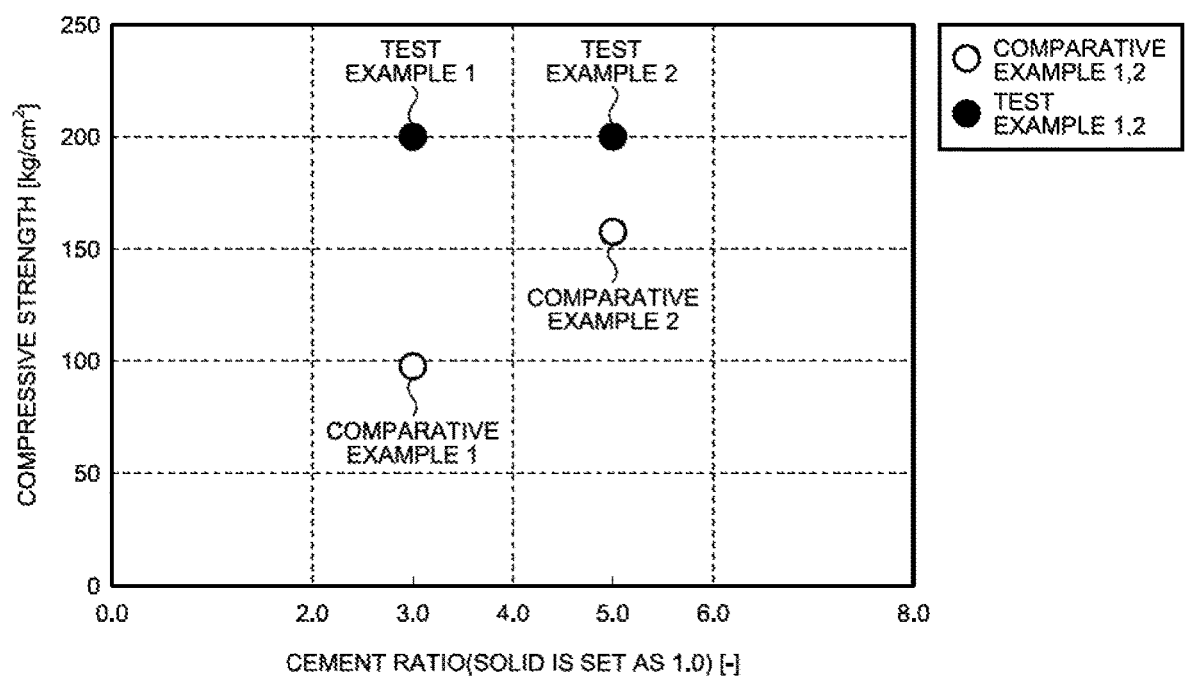
FIG. 2 is a diagram illustrating the relation between a cement addition weight rate (solid component is set as 1) and cement compressive strength ($kg/cm^2$).

FIG. 2 is a diagram illustrating the relation between a cement addition weight rate (solid component is set as 1) and the cement compressive strength (kg/cm$^2$).

In the test examples, the solid material of evaporated salts that are the waste 11 was made into the slurried material 13 with the solvent water 12, and the slurried material 13 and the cement solidifying agent 17 were mixed together to obtain the cement kneaded product 19, and then drying and curing and then solidifying were carried out to form the cement solidified product 21.

In the comparative examples, the solid material of evaporated salts that is the waste 11 and the cement solidifying agent 17 were mixed together as with a conventional case, water was added to obtain the cement kneaded product 19, and then drying and curing and then solidifying were carried out to form the cement solidified product 21.

As for the cement ratio, the solid material of evaporated salts was set as 1, and the compressive strength of the cement solidified products 21 in the test example 1 and the comparative example 1, in which the cement three times the solid material (cement ratio 3) was added, was obtained.

In the same manner, the compressive strength of the cement solidified products 21 in the test example 2 and the comparative example 2, in which the cement five times the solid material (cement ratio 5) was added, was obtained.

In this test, as the cement solidifying agent, ordinary Portland cement was used. After putting the cement solidifying agent 17 in, kneading was carried out for a certain time and drying was carried out under a certain condition. After drying, curing was carried out under atmospheric pressure at room temperature for a certain time.

As illustrated in FIG. 2, the cement solidified products 21 in the test examples 1 and 2 were both 200 kg/cm$^2$ or greater. In contrast, the cement solidified product 21 in the comparative example 1 was 100 kg/cm$^2$, and the cement solidified product 21 in the comparative example 2 was 155 kg/cm$^2$.

Next, as for the chemical agent to be added at the time of cement solidification operation, elution property when an iron-based chemical agent A or an iron-based chemical agent B was added as the divalent iron-based chemical agent was checked by conducting elution Se concentration test.

Figure 3:
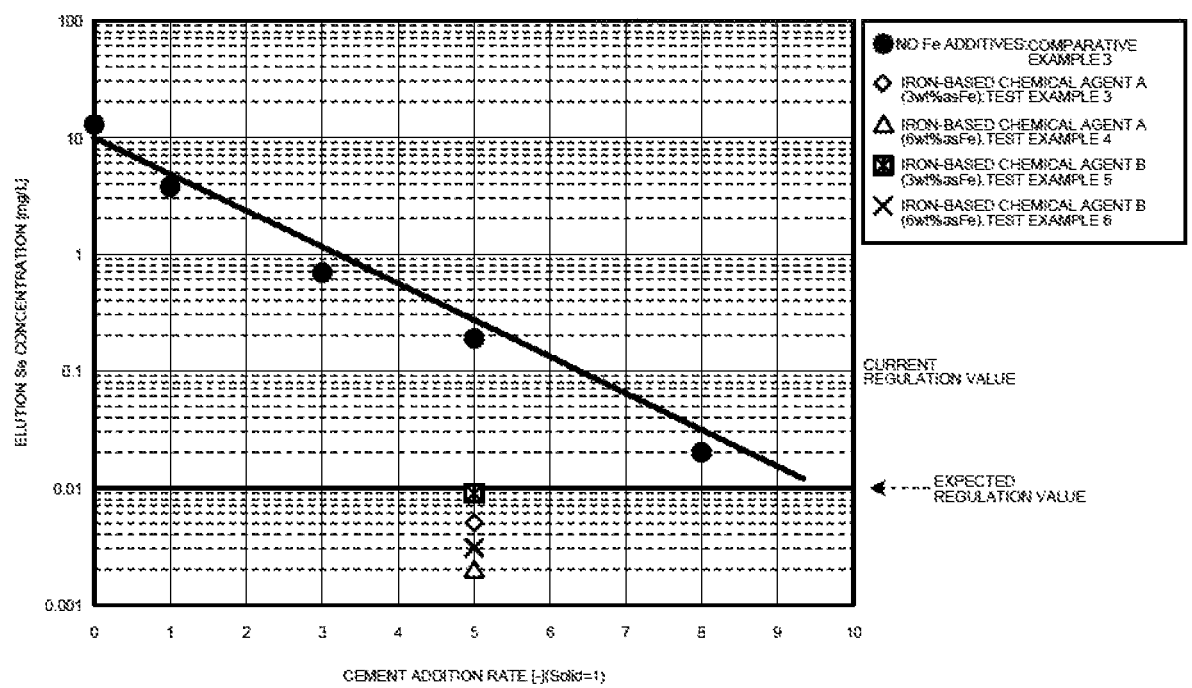
FIG. 3 is a diagram illustrating a result of elution Se concentration when an iron-based chemical agent A or an iron-based chemical agent B was added.

FIG. 3 is a diagram illustrating the result of elution Se concentration when the iron-based chemical agent A or the iron-based chemical agent B was added. In the test in FIG. 3, the cement ratio was set to 5.

The condition of cement solidification in the present test was made to be the same as that in the test in FIG. 2. As for the waste, the evaporated salts obtained by evaporating and solidifying the desulfurized effluent were used, and the waste for which the selenium (Se) concentration in the waste was 330 mg/kg and for which, when the waste was dissolved in the solvent water, the selenium (Se) concentration was of 11 mg/L of tetravalent selenium and 2.3 mg/L of hexavalent selenium was used.

The elution test was conducted in accordance with the toxicity characteristic leaching procedure (TCLP) specified in U.S. EPA Method 1311 in the following manner.

A part of the cement solidified product 21 that was dried and cured for a certain time is taken out and a certain amount is put into an aqueous solution of glacial acetic acid. With a rotary stirrer for TCLP test, it was shaken for 18 hours. Incidentally, the cement solidified products 21 for which the diameter is 9.5 mm or greater were milled and tested. After the rotary shaking, filtration was carried out by using a glass filtering device, and the quantitative analysis was carried out on the filtrate. As for the quantitative analysis, high-frequency inductively coupled plasma (ICP) absorptiometry was carried out.

As illustrated in FIG. 3, when the iron-based chemical agent A of 3% by weight in terms of iron concentration was added (test example 3), when the iron-based chemical agent A of 6% by weight in terms of iron concentration was added (test example 4), when the iron-based chemical agent B of 3% by weight in terms of iron concentration was added (test example 5), and when the iron-based chemical agent B of 6% by weight in terms of iron concentration was added (test example 6) were all 0.01 mg/L or less.

In contrast, when no iron-based chemical agent was added (comparative example 3), the cement ratio was 7 and, even when the cement ratio was 8, it was not possible to achieve 0.01 mg/L or less.

As the reason why favorable results were obtained only when the iron-based chemical agents A and B were added as in the foregoing, it is presumed that the following phenomenon has occurred. That is, in the slurrying vessel 14 first, by adding the iron-based additive 15 in a suspension in which the evaporated salts that are the waste 11 were dissolved and slurried in the solvent water 12, hexavalent selenium in the slurry is reduced by the iron-based additive 15 to tetravalent selenium that is more likely to be eluted into a solid phase than the hexavalent selenium. Then, by the addition of the cement solidifying agent 17, the tetravalent selenium is coprecipitated in a solid phase when the alkali and iron in the cement solidifying agent 17 react with each other and produce iron hydroxide and, in a state of further carrying out the foregoing dispersion and homogenization and increasing the compressive strength of the cement, the solidification of the cement is favorably promoted.

Incidentally, as of 2015, the selenium (Se) that is one of the harmful substances is so specified that the wastewater standard value in Japan is 0.1 mg/L or less, and the emission standard is expected to be more stringent in the future. According to the present invention, however, it can sufficiently deal with the strict selenium regulation standards of landfill disposal matter at that time (for example, 0.01 mg/L or less, when the standard value becomes 1/10th of the current standard value of 0.1 mg/L or less). Furthermore, in countries other than Japan, some of those planning to strengthen the discharge regulations are planning to strengthen, in addition to the wastewater regulations, the regulations on the elution value of each component of landfill waste also. In particular, on mercury (Hg), arsenic (As), and selenium (Se) in the landfill controlled substances, it can adequately deal with the elution regulations that are at an about 1/10th level of Japan by the ministries of environment of the relevant countries.

As just described, in order to obtain the cement solidified product 21, after the slurried material 13 is obtained first by slurrying the waste 11 by using the solvent water 12, the powdery cement solidifying agent 17 is added to the slurried material 13, the kneading treatment is carried out in the cement kneading vessel 20, and the cement kneaded product 19 is obtained. Subsequently, the obtained cement kneaded product 19 is dried and cured, and then the solidification treatment is carried out, thereby obtaining the cement solidified product 21.

It is preferable that the ratio of the waste (solid material) and the cement at this time be 1:3 to 1:6, preferably 1:5.

In the case of solid material:cement=1:5, it is preferable that the iron-based chemical agent A or the iron-based chemical agent B be 3% by weight or greater in terms of iron concentration, preferably 5% by weight or greater in terms of iron concentration, and more preferably 6% by weight or greater in terms of iron concentration.

It is preferable that the moisture addition rate (moisture/total weight (waste, cement solid agent, iron-based additive)) be 20% or greater, more preferably 30% or greater, for example.

The cement solidification method for waste includes a slurrying process of dissolving and slurrying the waste (concentrate, or evaporated salts) 11 containing heavy metals and deliquescent compounds in the solvent water 12 to obtain the slurried material 13; an iron-based additive adding process of adding the iron-based additive 15 to the slurried material 13; a cement-solidifying agent adding process of adding the cement solidifying agent 17 to the slurried material 13 in which the iron-based additive 15 is mixed and that contains heavy metals, followed by kneading; and a cement solidifying process of curing the cement kneaded product 19 in which the cement solidifying agent 17 is mixed to solidify cement.

As a result, without kneading the waste 11 and the cement solidifying agent 17 as is in a solid state like the conventional case, the slurried material 13 is obtained in the slurrying vessel 14 first. Then, after dispersing and homogenizing the slurry, by adding the cement solidifying agent 17 to the slurried material 13, followed by kneading in the cement kneading vessel 20, it is possible to increase the solidification strength of the cement solidified product 21 with a smaller amount of cement.

That is, by the slurrying process of dissolving and slurrying the waste 11 containing harmful substances and deliquescent compounds in the solvent water 12 to obtain the slurried material, the dispersion and homogenization of harmful substances in the waste 11 are achieved. Thereafter, by the iron-based additive adding process of adding the iron-based additive 15 to the slurried material 13 containing harmful substances and deliquescent compounds, hexavalent selenium as the harmful substance in the slurry is reduced to tetravalent selenium that is likely to be eluted into a solid phase than the hexavalent selenium, for example. Then, by the cement-solidifying agent adding process of adding the cement solidifying agent 17 to the slurried material 13 in which the iron-based additive 15 is mixed and contains harmful substances and deliquescent compounds, followed by kneading, the tetravalent selenium is coprecipitated in a solid phase when the alkali and iron in the cement solidifying agent 17 react with each other and produce iron hydroxide and, in a state of further carrying out the foregoing dispersion and homogenization and increasing the compressive strength of the cement, the solidification reaction of the cement is favorably promoted.

Along with the increase in the cement solidification strength, the exudation of moisture on the surface of the cement solidified product due to the deliquescent compounds is also reduced. As a result, because it is possible to retain the harmful substances that ooze out to the outside accompanying the deliquescent compounds in the inside of the solidified product and to reduce the elution concentration of the relevant harmful substances also, even when the landfill disposal is carried out over a long period of time, it is possible to obtain the cement solidified product 21 that satisfies the environmental emission standards.

Next, the overall operation of the cement solidification device 10 in the first embodiment will be described.

In the cement solidification device 10 in the first embodiment, the waste 11 containing various harmful substances and deliquescent compounds is introduced into the slurrying vessel 14, and with the solvent water 12, the slurried material 13 is obtained. At this time, the iron-based additive 15 is added to the slurried material 13. By adding the solvent water 12 to make the waste 11 into the slurry, it is possible to achieve the dispersion and the homogenization of the harmful substances that are in the waste 11. The slurried material 13 is introduced into the cement kneading vessel 20, the cement solidifying agent 17 is supplied from the cement-solidifying agent supply unit 18, and the cement kneaded product 19 is obtained. The cement kneaded product 19 is, in the cement solidification unit 22, dried and cured and then solidified, and the cement solidified product 21 of high compressive strength is obtained.

As just described, according to the first embodiment, in carrying out the cement solidification treatment of the waste 11 containing various harmful substances and deliquescent compounds, when it contains harmful substances and deliquescent compounds, because the cement solidification treatment is carried out by supplying the cement solidifying agent 17 after the slurried material is once obtained, it is possible to obtain the cement solidified product 21 of high compressive strength. As a result, when carrying out the landfill disposal of the cement solidified product 21 separately, because the immobilizing treatment has been reliably carried out, it is possible to carry out the landfill disposal of the cement solidified product 21 that satisfies the environmental emission standards.

Second Embodiment

Figure 4:
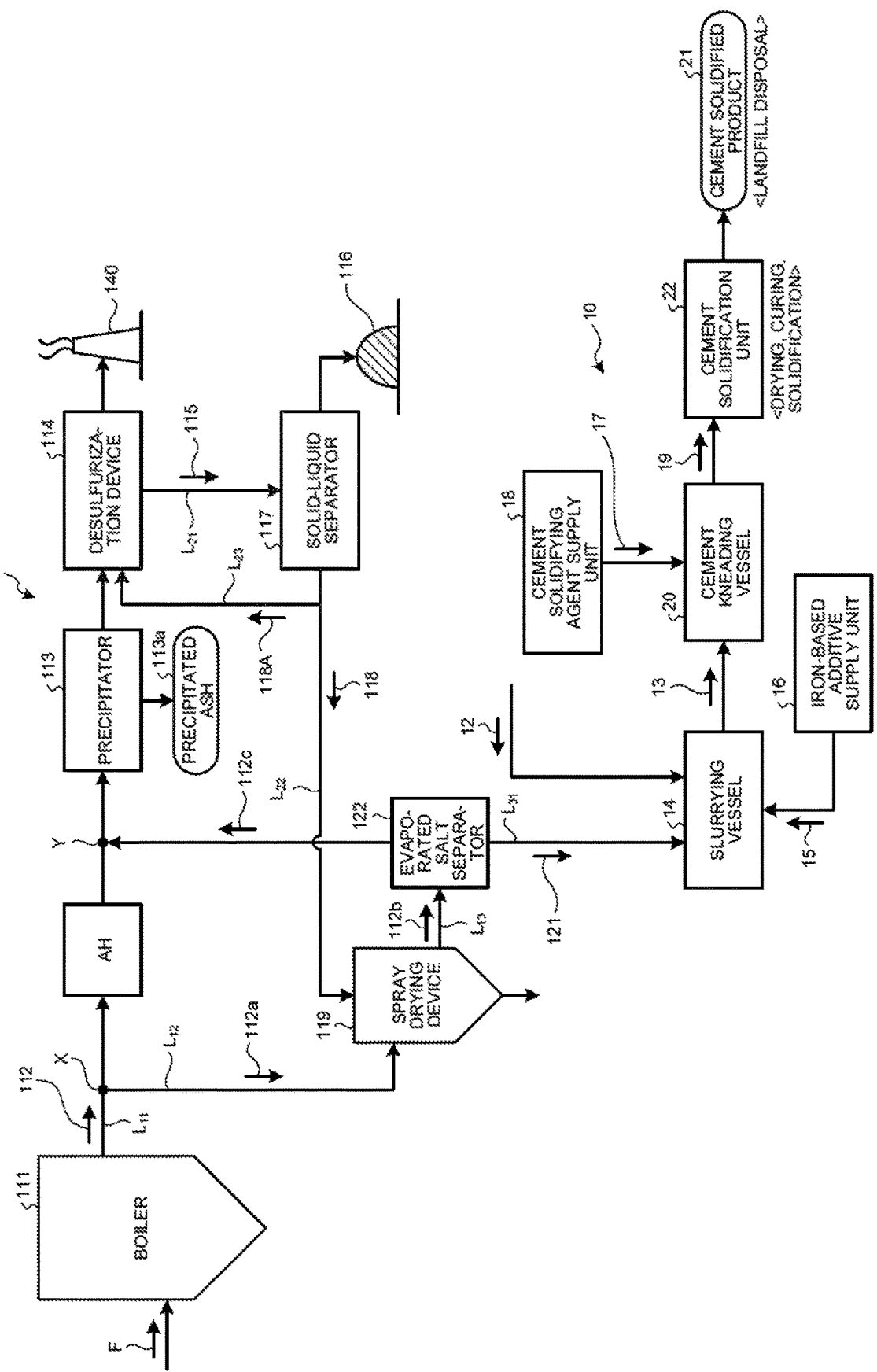
FIG. 4 is a schematic diagram of a zero-liquid discharge air pollution control system according to a second embodiment.

FIG. 4 is a schematic diagram of a zero-liquid discharge air pollution control system according to a second embodiment.

As illustrated in FIG. 4, a zero-liquid discharge air pollution control system 100A in the second embodiment includes a boiler 111 that combusts fuel F; an air heater AH that is a heat recovery device that is provided on a main flue gas duct $L_{11}$ discharging boiler flue gas 112 from the boiler 111 and recovers the heat of the boiler flue gas 112; a precipitator 113 that is a dust removal device that removes soot dust in the boiler flue gas 112 after the heat recovery; a desulfurization device 114 that removes sulfur oxides contained in the boiler flue gas 112 after the dust removal; a solid-liquid separator 117 that removes solid material 116 from the desulfurized effluent (absorbent slurry in the case of absorbent method) 115 discharged from the desulfurization device 114; a spray drying device 119 that sprays separated water 118 from the solid-liquid separator 117; a flue-gas introduction line $L_{12}$ that introduces to the spray drying device 119 a branched gas 112a that is a part of the boiler flue gas 112 from the main flue gas duct $L_{11}$; a discharged-gas supply line $L_{13}$ that returns to the main flue gas duct $L_{11}$ a discharged gas 112b after evaporating and drying the separated water 118 by the spray drying device 119; an evaporated salt separator 122 that is provided on the discharged-gas supply line $L_{13}$ and that separates evaporated salts 121 containing harmful substances and deliquescent compounds in the discharged gas 112b; the slurrying vessel 14 that dissolves and slurries the separated evaporated salts 121 in the solvent water 12 and obtains the slurried material 13; the iron-based additive supply unit 16 that adds the iron-based additive 15 into the slurrying vessel 14; the cement kneading vessel 20 that adds the cement solidifying agent 17 from the cement-solidifying agent supply unit 18 to the slurried material 13 in which the iron-based additive 15 is mixed to obtain the cement kneaded product 19; and the cement solidification unit 22 that dries and cures and then solidifies the cement kneaded product 19 to form the cement solidified product 21.

With this system, the boiler flue gas 112 is purified in the desulfurization device 114, and the desulfurized effluent 115 thereof is separated into solid and liquid and the separated water 118 is evaporated and dried by using the introduced branched gas 112a in the spray drying device 119. Thus, it is possible to stably carry out zero-liquid discharge of the desulfurized effluent 115 from the desulfurization device 114.

The air heater AH of the zero-liquid discharge air pollution control system 100A is a heat exchanger that recovers the heat in the boiler flue gas 112 supplied via the main flue gas duct $L_{11}$ from the boiler 111. Because the temperature of the discharged boiler flue gas 112 is at high temperature of 300 to 400° C. for example, heat exchange is made between the boiler flue gas 112 of high temperature and combustion air of normal temperature by the air heater AH, and the combustion air that was made high in temperature by the heat exchange is supplied to the inside of the boiler 111.

When branching the boiler flue gas 112 that flows into the air heater AH as the branched gas 112a from the main flue gas duct $L_{11}$ via the flue-gas introduction line $L_{12}$, the gas temperature of the branched gas 112a is high (for example, 300 to 400° C.) and thus, by bringing the separated water 118 into contact with the high-temperature exhausted heat, it is possible to efficiently perform the spray drying of the desulfurized effluent droplets. In the second embodiment, the air heater AH is installed between a branch portion X of the flue-gas introduction line $L_{12}$ that bifurcates the branched gas 112a and a confluence portion Y that returns a discharged gas 12c to the main flue gas duct $L_{11}$ side via the discharged-gas supply line $L_{13}$.

The precipitator 113 removes the soot dust in the boiler flue gas 112 from the boiler 111. Examples of the precipitator 113 include, but are not limited to, an inertial force precipitator, a centrifugal force precipitator, a filtration precipitator, an electronic precipitator, and a scrubbing precipitator, for example.

The desulfurization device 114 is a device that removes, by a wet process, sulfur oxides in the boiler flue gas 112 after having removed the soot dust by the precipitator 113. In the wet-type desulfurization device 114, as a wet desulfurization method, the desulfurization method of limestone gypsum method that uses limestone slurry as the desulfurization absorbent (hereinafter also referred to as "absorbent") can be used, for example. As for the desulfurization method other than the limestone gypsum method, a wet desulfurization device suitable for magnesium hydroxide method, seawater method, sodium hydroxide method, and others may be exemplified.

Figure 5:
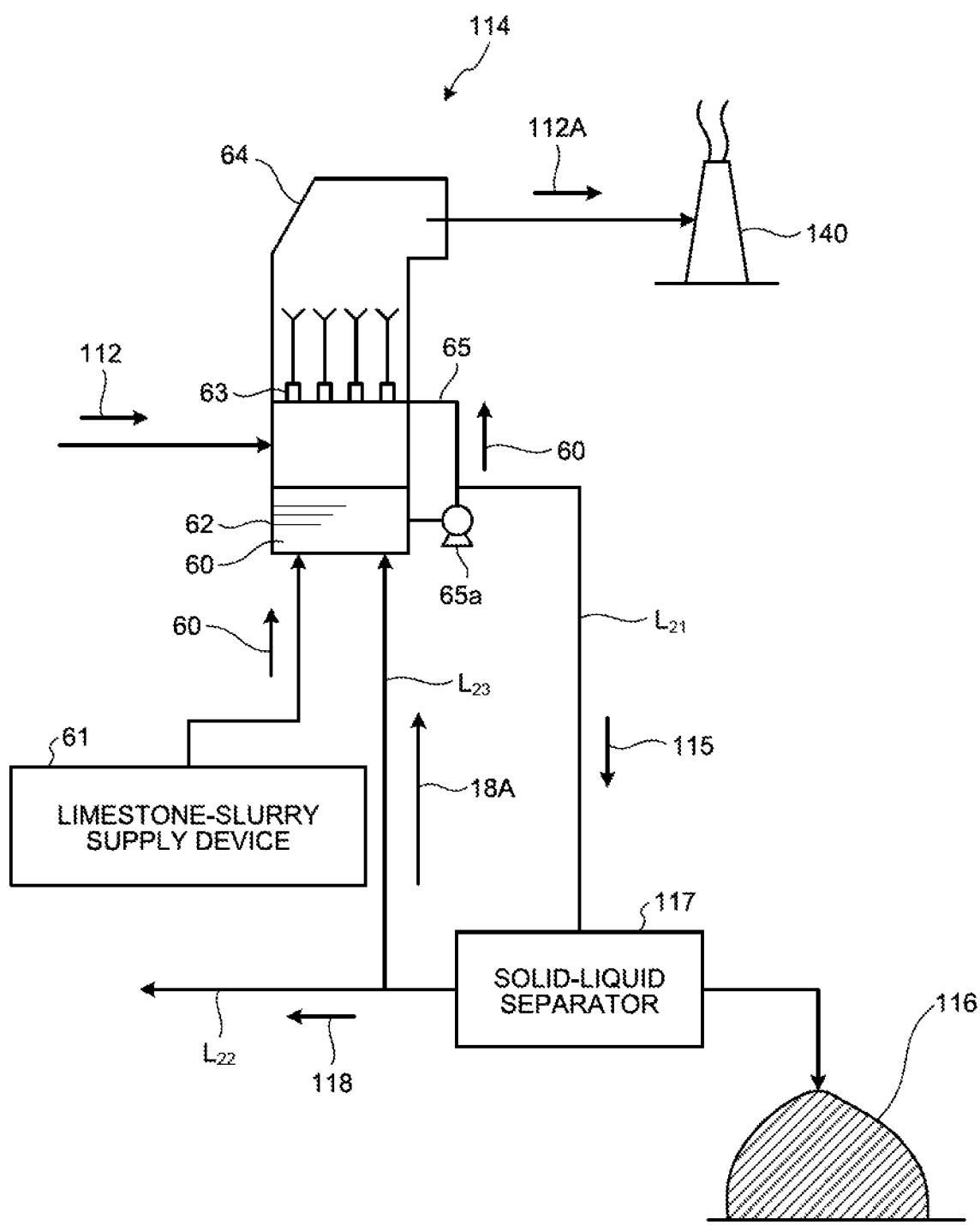
FIG. 5 is a schematic diagram illustrating one example of a desulfurization device of a limestone gypsum method.

An example of the wet desulfurization device will be described with reference to FIG. 5. FIG. 5 is a schematic diagram illustrating one example of a desulfurization device for the limestone gypsum method. As illustrated in FIG. 5, the wet desulfurization device 114 uses limestone slurry (an aqueous solution obtained by dissolving limestone powder in water) 60 as the absorbent, and the internal temperature of the device is about 50° C., for example. The limestone slurry 60 is supplied from a limestone-slurry supply device (limestone supply device for desulfurizer) 61 to a reservoir in a tower bottom portion 62 of the desulfurization device 114. The limestone slurry 60 supplied to the tower bottom portion 62 of the desulfurization device 114 is sent to a plurality of nozzles 63 in the desulfurization device 114 via an absorbent circulation line 65 and is jetted upward from the nozzles 63 toward a tower top portion 64 side as a fountain-like manner. The absorbent circulation line 65 is provided with a liquid feed pump 65a, and by driving the liquid feed pump 65a, the limestone slurry 60 is sent from the absorbent circulation line 65 to the nozzles 63. As the boiler flue gas 112 rising from the tower bottom portion 62 side of the desulfurization device 114 makes gas-liquid contact with the limestone slurry 60 jetted from the nozzles 63, sulfur oxides and mercury chloride in the boiler flue gas 112 are absorbed into the limestone slurry 60 and are separated and removed from the boiler flue gas 112. The boiler flue gas 112 purified by the limestone slurry 60 is discharged from the tower top portion 64 side of the desulfurization device 114 as purified gas 112A, and is released to the outside from a stack 140.

In the inside of the desulfurization device 114, sulfurous acid gas $SO_2$ in the boiler flue gas 112 reacts with the limestone slurry 60 as expressed by the following Formula 1.

$$SO_2+CaCO_3 \rightarrow CaSO_3+CO_2 \quad \text{Formula 1}$$

Moreover, the limestone slurry 60 that absorbed $SO_x$ in the boiler flue gas 112 is oxidized by the air (not depicted) supplied to the tower bottom portion 62 of the desulfurization device 114, and reacts with the air as expressed by the following Formula 2.

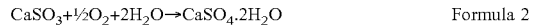

$$CaSO_3+\tfrac{1}{2}O_2+2H_2O \rightarrow CaSO_4 \cdot 2H_2O \quad \text{Formula 2}$$

In this way, $SO_x$ in the boiler flue gas 112 is trapped in the desulfurization device 114 in the form of gypsum ($CaSO_4 \cdot 2H_2O$).

As in the foregoing, the limestone slurry 60 is used by pumping up the liquid stored in the tower bottom portion 62 of the desulfurization device 114. However, the pumped limestone slurry 60 is, along with the operation of the desulfurization device 114 in which the gypsum ($CaSO_4 \cdot 2H_2O$) is mixed in accordance with the reaction formulas 1 and 2. In the following description, the limestone gypsum slurry (gypsum-mixed limestone slurry) for absorbing sulfurous acid gas is referred to as absorbent.

The absorbent (limestone slurry 60) used for desulfurization in the desulfurization device 114 is circulated and reused via the absorbent circulation line 65 of the desulfurization device 114. Also, a part of the absorbent is discharged to the outside as the desulfurized effluent 115 via an absorbent discharge line $L_{21}$ connected to the absorbent circulation line 65, is separately sent to the solid-liquid separator 117, and is dehydrated there. The separated water 118 after the solid-liquid separation contains harmful heavy metals such as mercury, arsenic, selenium, and others, and halogen ions such as Cl⁻, Br⁻, I⁻, F⁻, and others, for example.

The solid-liquid separator 117 separates the solid material (gypsum) 116 and the separated water (filtrate) 118 of the liquid portion in the desulfurized effluent 115. As the solid-liquid separator 117, for example, a belt filter, a centrifugal separator, a decanter-type centrifugal settler, or the like is used. Thus, the desulfurized effluent 115 discharged from the desulfurization device 114 is separated, by the solid-liquid separator 117, into the solid material (gypsum) 116 and the separated water 118 that is the dehydrated filtrate. The separated solid material (gypsum) 116 is discharged to the outside of the system (hereinafter referred to as "outside the system").

Meanwhile, the separated water 118 from the solid-liquid separator 117 is, as illustrated in FIG. 4, sent to the spray drying device 119 via a separated-water introduction line $L_{22}$ and is made to evaporate and dry there, so as to achieve zero-liquid discharge of the separated water 118 that is the desulfurized effluent. A part of the separated water 118 is supplied as return water 118A into the tower bottom portion 62 of the desulfurization device 114 via a return water line $L_{23}$.

The spray drying device 119 includes a gas introduction device into which the branched gas 112a from the boiler flue gas 112 is introduced via the flue-gas introduction line $L_{12}$ branched from the main flue gas duct $L_{11}$ for the boiler flue gas 112 from the boiler 111, and a spray device 52 that sprinkles or sprays the separated water 118 introduced from the solid-liquid separator 117 via the separated-water introduction line $L_{22}$. Then, by the exhausted heat of the introduced branched gas 112a, the sprinkled or sprayed separated water 118 is made to evaporate and dry. The branched gas 112a from the boiler flue gas 112 contains combustion ash contained in the boiler flue gas 112 and, in the evaporated and dried material generated in the spray drying device 119, there are combustion ash and evaporated salts in a state of being mixed. In the flue-gas introduction line $L_{12}$ and the discharged-gas supply line $L_{13}$, a dumper device that stops the inflow and discharge of the branched gas 112a and the discharged gas 12c may be provided.

In the zero-liquid discharge air pollution control system 100A in the second embodiment, although not provided, in the main flue gas duct $L_{11}$, a denitration device that removes nitrogen oxides in the boiler flue gas 112 may be separately provided. In the case of providing the denitration device, it is preferable to install it downstream of the boiler 111 and on the upstream side of the branch portion X at which the branched gas 112a is branching from the main flue gas duct $L_{11}$.

Figure 6:
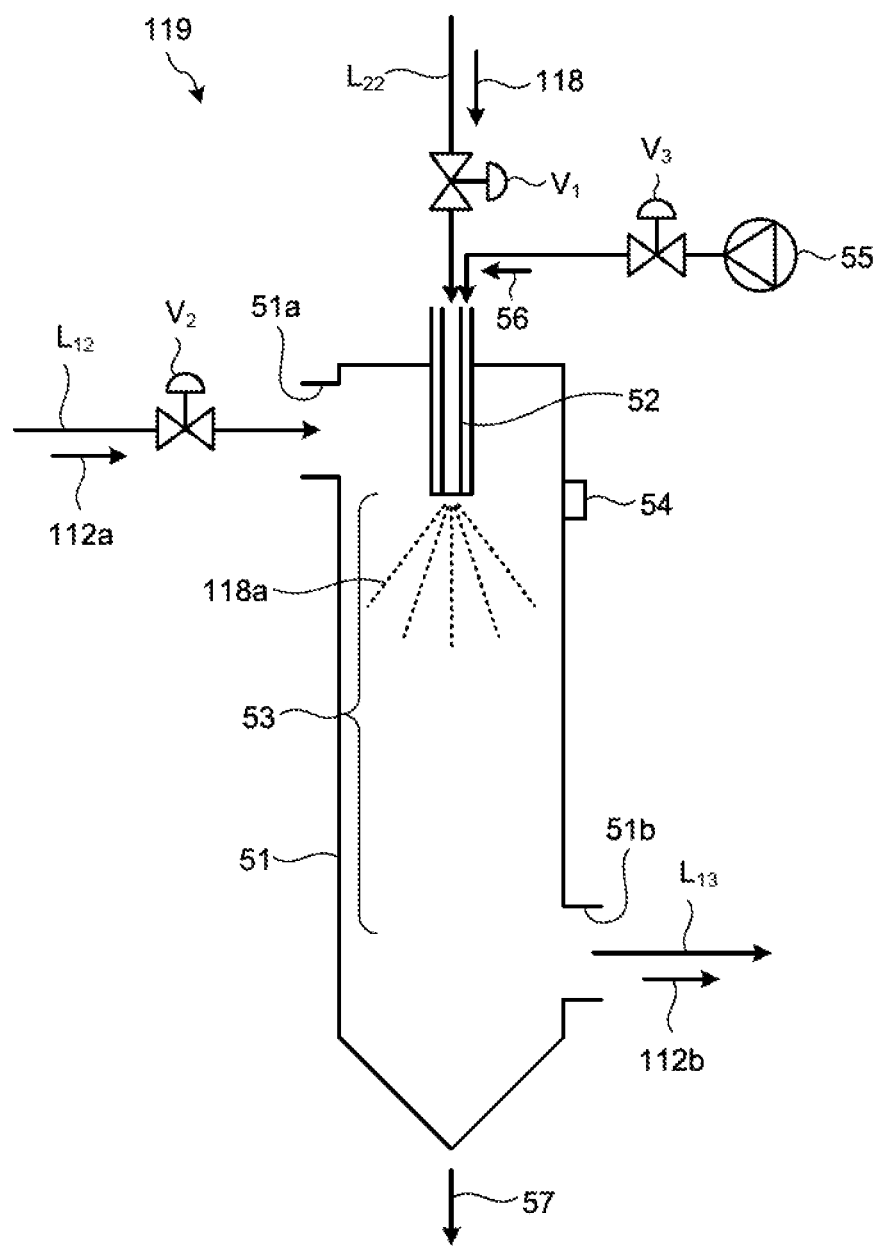
FIG. 6 is a schematic diagram illustrating one example of a spray drying device of desulfurized effluent in the second embodiment.

FIG. 6 is a schematic diagram illustrating one example of a spray drying device of desulfurized effluent in the second embodiment. As illustrated in FIG. 6, the spray drying device 119 in the second embodiment includes the spray device 52 provided in a spray-drying device body 51 and spraying the separated water 118 as spray liquid 118a; an introduction port 51a provided on the spray-drying device body 51 and introducing the branched gas 112a that dries the spray liquid 118a; a drying region 53 provided in the spray-drying device body 51 and drying and evaporating the spray liquid 118a by the branched gas 112a; a discharge port 51b discharging the discharged gas 112b that has contributed to drying; and a deposit monitoring device 54 monitoring a state of the adhesion of deposits on the spray device 52. The reference sign 57 denotes separated solid content, $V_1$ denotes a liquid flow rate adjustment valve, and $V_2$ and $V_3$ denote gas flow rate adjustment valves. The separated water 118 may be sprayed by the spray device 52 into the inside of the spray-drying device body 51, at a certain flow rate and a certain spray droplet particle diameter, by the air 56 separately supplied from a compressor 55. In the second embodiment, the branched gas 112a branched from the boiler flue gas 112 is used as the drying gas for the separated water 118. However, the present invention is not limited thereto, and a gas other than the boiler flue gas may be used as the drying gas, as long as it is a drying gas that evaporates and dries the separated water 118.

As for the spray device 52, the form thereof is not limited as long as it sprays the separated water 118 so as to be in a certain droplet diameter. For example, a spray device such as a two-fluid nozzle, a rotary atomizer, and others can be used. The two-fluid nozzle is suitable for spraying a relatively small amount of separated water 118, and the rotary atomizer is suitable for spraying a relatively large amount of separated water 118. The number of sprayers is not limited to one, and a plurality of sprayers may be provided depending on the amount of throughput.

The dissolved components (salts) dissolved in the desulfurized effluent 115 are, when dried as is in the spray drying device 119, contained in the discharged gas 112b discharged from the spray drying device 119 as the evaporated salts 121. Thus, when it is supplied to the precipitator 113 and precipitated, the dissolved components are to be contained in precipitated ash 113a.

When the precipitated ash 113a containing the dissolved components is landfilled as it is, the dissolved components from the precipitated ash 113a become a problem. Furthermore, by containing the evaporated salts 121, a precipitation load of the precipitator 113 is increased and an increase in the installed capacity of the precipitator 113 is needed.

In the second embodiment, the evaporated salts 121 are separated from the discharged gas 112b and treated such that no dissolved components are generated even when the precipitated ash 113a is landfilled.

In the second embodiment, as illustrated in FIG. 4, the evaporated salt separator 122 for carrying out the solid-gas separation of the evaporated salts 121, having solubility, in the discharged gas 112b discharged from the spray drying device 119 is provided on the discharged-gas supply line $L_{13}$.

The evaporated salt separator 122 is a device such as cyclone and a bag filter that separates solid content of the gas, and the separated evaporated salts 121 are then subjected to the cement solidification treatment. The flue gas 112c that the evaporated salts 121 have been separated is sent back to the main flue gas duct $L_{11}$ via the discharged-gas supply line $L_{13}$.

Because the separated evaporated salts 121 contain a large amount of deliquescent calcium chloride ($CaCl_2$), the deliquescent substances themselves dissolve by absorbing the moisture in the surrounding atmosphere after being landfilled in an as it is. Thus, higher cement strength is needed in order to confine them at the time of cement solidification treatment. Accordingly, in the second embodiment, the cement solidification treatment for obtaining high cement strength is carried out.

The cement solidification treatment in the second embodiment is carried out by using the cement solidification device 10 described in the first embodiment. In the first embodiment, the waste 11 as a target object is subjected to the cement solidification treatment. In the second embodiment, however, the objects of the cement solidification treatment are the evaporated salts 121.

As illustrated in FIG. 4, the cement solidification device 10 in the second embodiment includes an evaporated-salt discharge line $L_{31}$ that supplies the evaporated salts 121 containing harmful substances and deliquescent compounds from the evaporated salt separator 122 to the slurrying vessel 14; the slurrying vessel 14 that dissolves and slurries the evaporated salts 121 in the solvent water 12 and obtains the slurried material 13; the iron-based additive supply unit 16 that adds the iron-based additive 15 into the slurrying vessel 14; the cement kneading vessel 20 that adds the cement solidifying agent 17 from the cement-solidifying agent supply unit 18 to the slurried material 13 in which the iron-based additive 15 is mixed to obtain the cement kneaded product 19; and the cement solidification unit 22 that dries and cures and then solidifies the cement kneaded product 19 to form the cement solidified product 21.

The evaporated salts 121 that are objects of the cement solidification treatment in the second embodiment contain harmful substances such as heavy metals (for example, mercury (Hg), selenium (Se), and arsenic (As)), and together with the harmful substances, contain deliquescent compounds. The heavy metals mean metals having a specific gravity of four or greater, and the examples thereof may include lead (Pb), cadmium (Cd), chrome (Cr), manganese (Mn), cobalt (Co), nickel (Ni), copper (Cu), zinc (Zn), bismuth (Bi), and iron (Fe), in addition to mercury (Hg) and selenium (Se), for example.

The evaporated salts 121 of the treatment objects in the second embodiment contain, in addition to harmful substances, deliquescent compounds. The deliquescent compounds mean the substances that exhibit a phenomenon that the solid absorbs moisture in the air and the solid dissolves into the moisture, when the solid of the deliquescent compounds is left in the atmosphere. As general deliquescent compounds, the examples thereof may include calcium chloride ($CaCl_2$), and sodium hydroxide (NaOH), magnesium chloride ($MgCl_2$), for example.

The chemical agents (the cement solidifying agent 17, the iron-based additive 15) in the cement solidification treatment of the cement solidification device 10 in the second embodiment, the operating procedure of the cement solidification, and the test examples are the same as those in the first embodiment, and thus the redundant descriptions will be omitted.

The compressive strength (crushing strength) of the cement solidified product 21 obtained, by operating in the same manner as that in the first embodiment, by using the cement solidification device 10 of the zero-liquid discharge air pollution control system 100A in the second embodiment is preferable to be 150 kg/cm$^2$ or greater, more preferably 200 kg/cm$^2$ or greater, for example. The compressive strength can be an indicator indicating that the elution concentration is satisfied, by grasping beforehand the relation between the concentration of heavy metals contained in the evaporated salts 121 and a target elution concentration of the cement solidified product 21 when operating a plant and by periodically checking the target compressive concentration when operating under the same operating condition (for example, the same fuel). The compression strength is set in accordance with the elution standards. Thus, when the concentration of pure metal contained in the evaporated salts 121 is increased and the target of elution regulation becomes stringent, it is desirable to operate with high cement compressive strength as the indicator.

As just described, in order to obtain the cement solidified product 21 from the evaporated salts 121 separated from the evaporated salt separator 122, by operating in the same manner as in the first embodiment, after obtaining the slurried material 13 first by slurrying the evaporated salts 121 by using the solvent water 12, the powdery cement solidifying agent 17 is added to the slurried material 13, the kneading treatment is carried out in the cement kneading vessel 20, and the cement kneaded product 19 is obtained. Subsequently, the obtained cement kneaded product 19 is dried and cured, and then the solidification treatment is carried out, thereby obtaining the cement solidified product 21.

It is preferable that the ratio of the evaporated salts (solid material) and the cement at this time be 1:3 to 1:6, preferably 1:5.

In the case of solid material:cement=1:5, it is preferable to add the iron-based chemical agent A or the iron-based chemical agent B of 3% by weight or greater in terms of iron concentration, preferably 5% by weight or greater, and more preferably 6% by weight or greater.

It is preferable that the moisture addition rate (moisture/total weight (evaporated salts, cement solid agent, iron-based additive)) be 20% or greater, more preferably 30% or greater.

The cement solidification method of evaporated salts includes a slurrying process of dissolving and slurrying the evaporated salts (concentrate or evaporated salts) 121 containing heavy metals and deliquescent compounds in the solvent water 12 to obtain the slurried material 13; an iron-based additive adding process of adding the iron-based additive 15 to the slurried material 13; a cement-solidifying agent adding process of adding the cement solidifying agent 17 to the slurried material 13 in which the iron-based additive 15 is mixed and that contains heavy metals, followed by kneading; and a cement solidifying process of curing the cement kneaded product 19 in which the cement solidifying agent 17 is mixed to solidify cement.

As a result, in the second embodiment, without kneading the evaporated salts and the cement solidifying agent as it is in a solid state like the conventional case, after obtaining the slurried material 13 in the slurrying vessel 14 first and dispersing and homogenizing the slurry, the kneading treatment is carried out by adding the cement solidifying agent 17 to the slurried material 13 in the cement kneading vessel 20, and thus the solidification strength of the cement solidified product 21 is thereby increased with a smaller amount of cement.

That is, by the slurrying process of dissolving and slurrying the evaporated salts 121 after separation, for which the solid-gas separation of the evaporated salts 121 containing harmful substances and deliquescent compounds in the boiler flue gas 112 after the spray drying treatment in the spray drying device 119, is carried out in the evaporated salt separator 122, in the solvent water 12 to obtain the slurried material, the dispersion and homogenization of harmful substances in the evaporated salts 121 are achieved. Thereafter, by the iron-based additive adding process of adding the iron-based additive 15 to the slurried material 13 containing harmful substances and deliquescent compounds, the hexavalent selenium as the harmful substance in the slurry is reduced to the tetravalent selenium that is likely to be eluted into a solid phase than the hexavalent selenium, for example. Then, by the cement-solidifying agent adding process of adding the cement solidifying agent 17 to the slurried material 13 in which the iron-based additive 15 is mixed and that contains harmful substances and deliquescent compounds, followed by kneading, the tetravalent selenium is coprecipitated in a solid phase when the alkali and iron in the cement solidifying agent 17 react with each other and produce iron hydroxide and, in a state of further carrying out the foregoing dispersion and homogenization and increasing the compressive strength of the cement, the solidification reaction of the cement is favorably promoted.

Along with the increase in the cement solidification strength, the exudation of moisture on the surface of the cement solidified product due to the deliquescent compounds is also reduced. As a result, because it is possible to retain the harmful substances that ooze out to the outside accompanying the deliquescent compounds inside the solidified product and to reduce the elution concentration of the relevant harmful substances also, even when the landfill disposal is carried out over a long period of time, it is possible to obtain the cement solidified product 21 that satisfies the environmental emission standards.

Next, the overall operation of the zero-liquid discharge air pollution control system 100A in the second embodiment will be described. In the zero-liquid discharge air pollution control system 100A in the second embodiment, the heat of the boiler flue gas 112 from the boiler 111 of coal combustion type is recovered by the air heater AH, and then, the soot dust in the boiler flue gas 112 is removed in the precipitator 113. The boiler flue gas 112 from which the soot dust has been removed is introduced into the desulfurization device 114, the sulfur content (S content) in the boiler flue gas is removed by the limestone absorbent for example, and then the purified flue gas is discharged to the outside from the stack 140. The desulfurized effluent 115 from the desulfurization device 114 is introduced into the solid-liquid separator 117, the solid material (gypsum) 116 is separated, and a part of the separated water 118 is returned to the desulfurization device 114 as the return water 118A. Subsequently, the separated water 118 is introduced into the spray drying device 119 for the zero-liquid discharge treatment. In the spray drying device 119 that the separated water 118 is introduced into, by introducing the branched gas 112a that is a part of the boiler flue gas 112, it is possible to spray-dry the separated water 118 and to carry out the zero-liquid discharge treatment of the separated water 118 from the desulfurized effluent.

The discharged gas 112b that has contributed to the drying from the spray drying device 119 is separated in the evaporated salt separator 122 into the evaporated salts 121 that are the solid content in the gas. The separated evaporated salts 121 are introduced into the slurrying vessel 14, and with the solvent water 12, the slurried material 13 is obtained. At this time, the iron-based additive 15 is added to the slurried material 13. By adding the solvent water 12, the once dried evaporated salts 121 are made into slurry with the solvent water 12, and thus it is possible to achieve the dispersion and homogenization of the harmful substances that are in the evaporated salts 121. The slurried material 13 is introduced into the cement kneading vessel 20, the cement solidifying agent 17 is supplied from the cement-solidifying agent supply unit 18, and the cement kneaded product 19 is obtained. The cement kneaded product 19 is, in the cement solidification unit 22, dried and cured and then solidified, and the cement solidified product 21 of high compressive strength is obtained.

As in the foregoing, according to the second embodiment, because the solid content of the evaporated salts 121 contained in the discharged gas 112b that has contributed to the drying in the spray drying device 119 is separated in the evaporated salt separator 122, the amount of solid material in the discharged gas 112c that is returned to the main flue gas duct $L_{11}$ is reduced. As a result, the load to the precipitator 113 is reduced, and there is no need to improve the precipitation capability of the precipitator 113.

Although the separated evaporated salts 121 are subsequently subjected to the cement solidification treatment, when they contain harmful substances and deliquescent compounds, because the cement solidification treatment is carried out by supplying the cement solidifying agent 17 in the cement kneading vessel 20 after the slurried material 13 is once obtained in the slurrying vessel 14, it is possible to obtain the cement solidified product 21 of high compressive strength. As a result, when carrying out the landfill disposal of the cement solidified product 21 separately, because the cement immobilizing treatment has been carried out, it is possible to carry out the landfill disposal of the cement solidified product 21 that satisfies the environmental emission standards.

Third Embodiment

Figure 7:
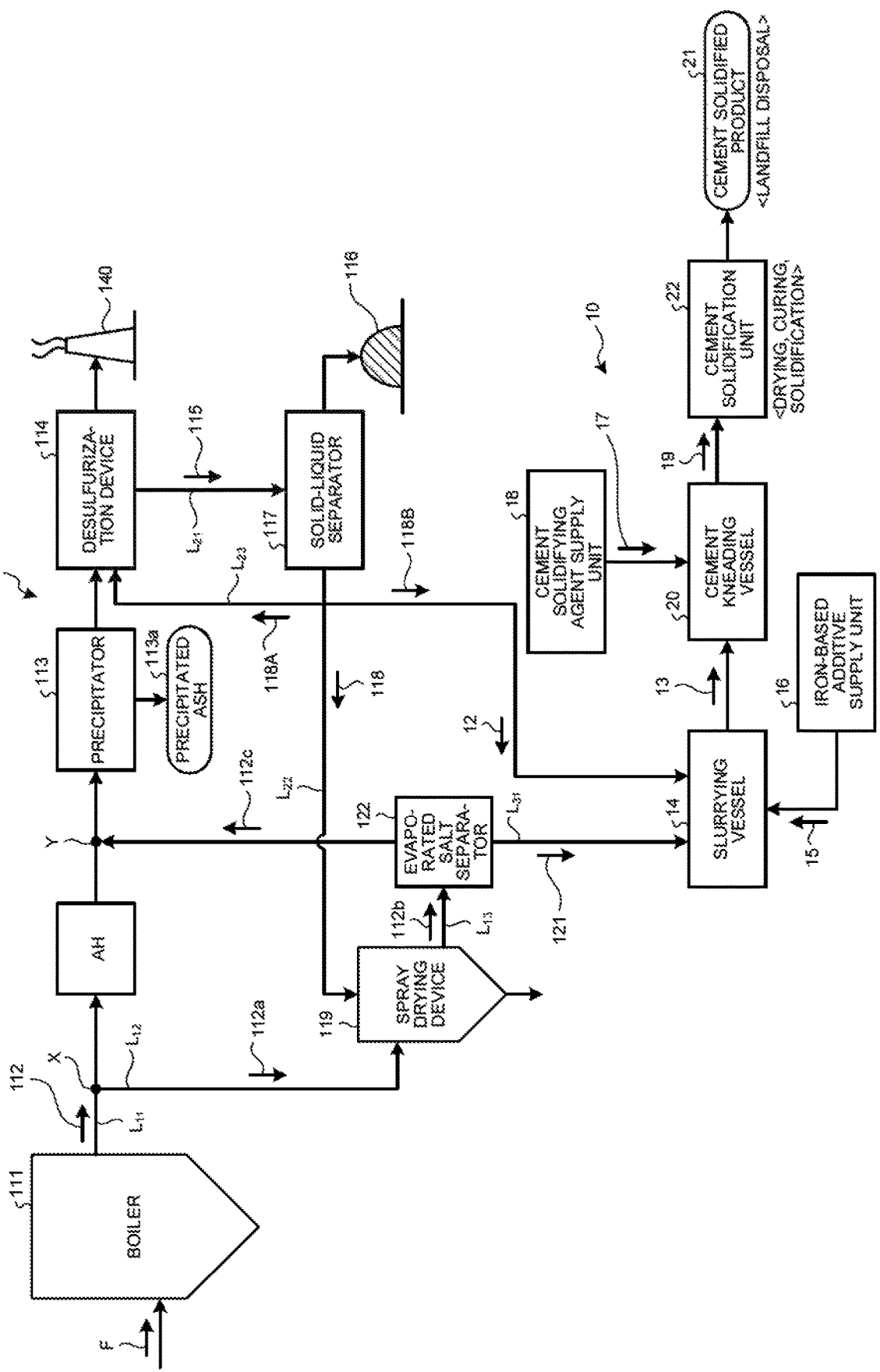
FIG. 7 is a schematic diagram of a zero-liquid discharge air pollution control system according to a third embodiment.

FIG. 7 is a schematic configuration diagram of a zero-liquid discharge air pollution control system according to a third embodiment. As for the members identical to those in the zero-liquid discharge air pollution control system in the second embodiment, the identical reference signs will be given to and the descriptions thereof will be omitted. In a zero-liquid discharge air pollution control system 100B in the second embodiment illustrated in FIG. 7, separated water 118B which the desulfurized effluent 115 is separated in the solid-liquid separator 117 is used as the solvent water 12 for slurrying the evaporated salts 121.

According to the third embodiment, at the time of the slurrying process in the slurrying vessel 14 in the second embodiment, the dissolution treatment is carried out by using a part 118B of the separated water 118 from the desulfurized effluent 115 as the solvent water, and thus it is possible to achieve cost reduction (for example, downsizing of the spray drying device 119, and reduction in operating cost thereof) in effluent volume reduction in the zero-liquid discharge air pollution control system 100B.

Fourth Embodiment

Figure 8:
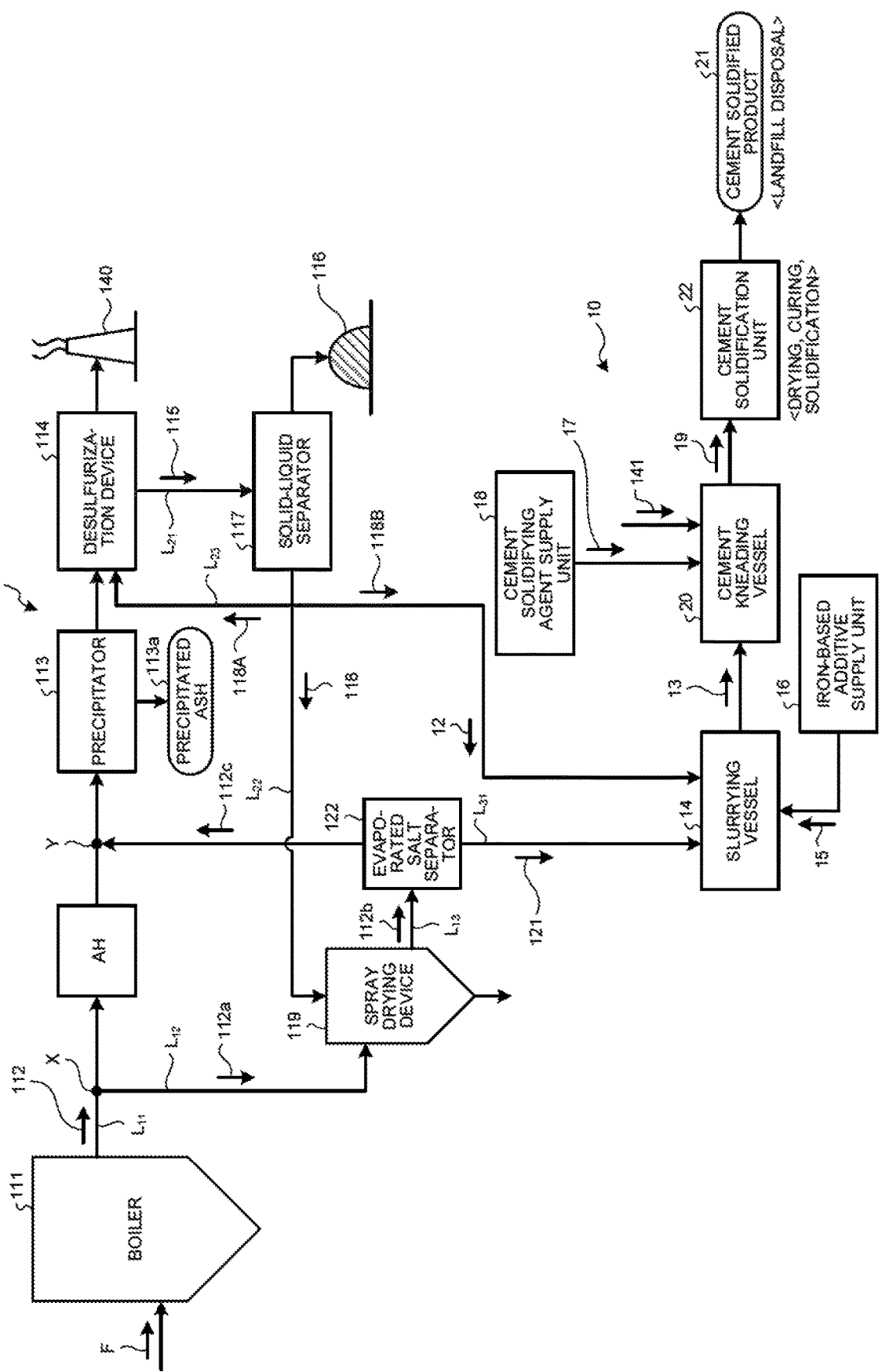
FIG. 8 is a schematic diagram of a zero-liquid discharge air pollution control system according to a fourth embodiment.

FIG. 8 is a schematic configuration diagram of a zero-liquid discharge air pollution control system according to a fourth embodiment. As for the members identical to those in the zero-liquid discharge air pollution control systems in the second and the third embodiments, the identical reference signs will be given to and the descriptions thereof will be omitted. In a zero-liquid discharge air pollution control system 100C in the fourth embodiment illustrated in FIG. 8, when forming the cement kneaded product 19 by the cement solidifying agent 17 in the cement kneading vessel 20 in the third embodiment, fly ash 141 is to be added together with the cement solidifying agent 17. As for the fly ash 141, it is also possible to use the precipitated ash 113a from the precipitator 113 that removes the soot dust in the boiler flue gas 112.

By adding the fly ash 141, the evaporated salts 121 are diluted by the ash and inert ingredients in the fly ash 141, and because it is possible to reduce the apparent concentration of the deliquescent substances such as calcium chloride concentration in the evaporated salts 112 more as the amount of fly ash 141 is larger, it is also possible to reduce the deliquescent behavior, and the exudation of heavy metals on the surface of the cement solidified product 21 along with that. There is also an effect that the amount of throughput of the precipitated ash 113a that is discharged from the precipitator 113 and landfilled can be reduced.

Fifth Embodiment

Figure 9:
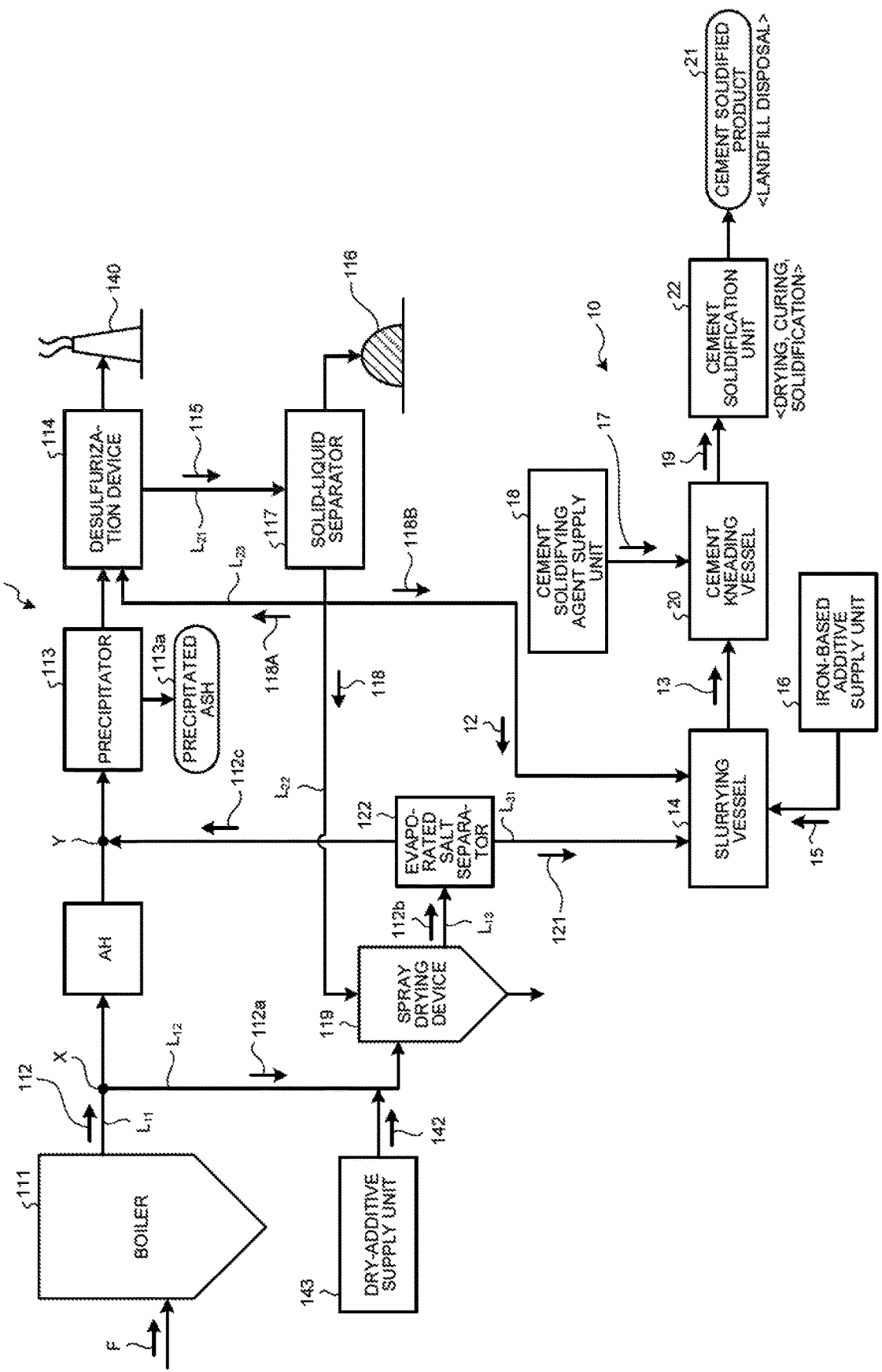
FIG. 9 is a schematic diagram of a zero-liquid discharge air pollution control system according to a fifth embodiment.

FIG. 9 is a schematic configuration diagram of a zero-liquid discharge air pollution control system according to a fifth embodiment. As for the members identical to those in the zero-liquid discharge air pollution control systems in the second and the third embodiments, the identical reference signs will be given to and the descriptions thereof will be omitted. In a zero-liquid discharge air pollution control system 100D in the fifth embodiment illustrated in FIG. 9, in the flue-gas introduction line $L_{12}$ that introduces the branched gas 112a into the spray drying device 119 in the third embodiment, a dry additive 142 is to be added from a dry-additive supply unit 143.

By adding the dry additive 142, the proportion of the solid content in the branched gas 112a is increased, and thus it is possible to promote the droplet evaporation of the separated water 118 and the solidification of the evaporated salts 121, in spray-drying in the spray drying device 119.

The dry additive 142 introduced into the flue-gas introduction line $L_{12}$ to promote evaporation may be other powder, and may be the cement solidifying agent 17, fly ash, and alkaline powder, for example. As for the alkaline powder, the examples thereof may include calcium carbonate (limestone), calcium hydroxide (slaked lime), and calcium sulfate (gypsum), for example. However, it is not limited to the foregoing as long as it promotes drying.

Figure 10:
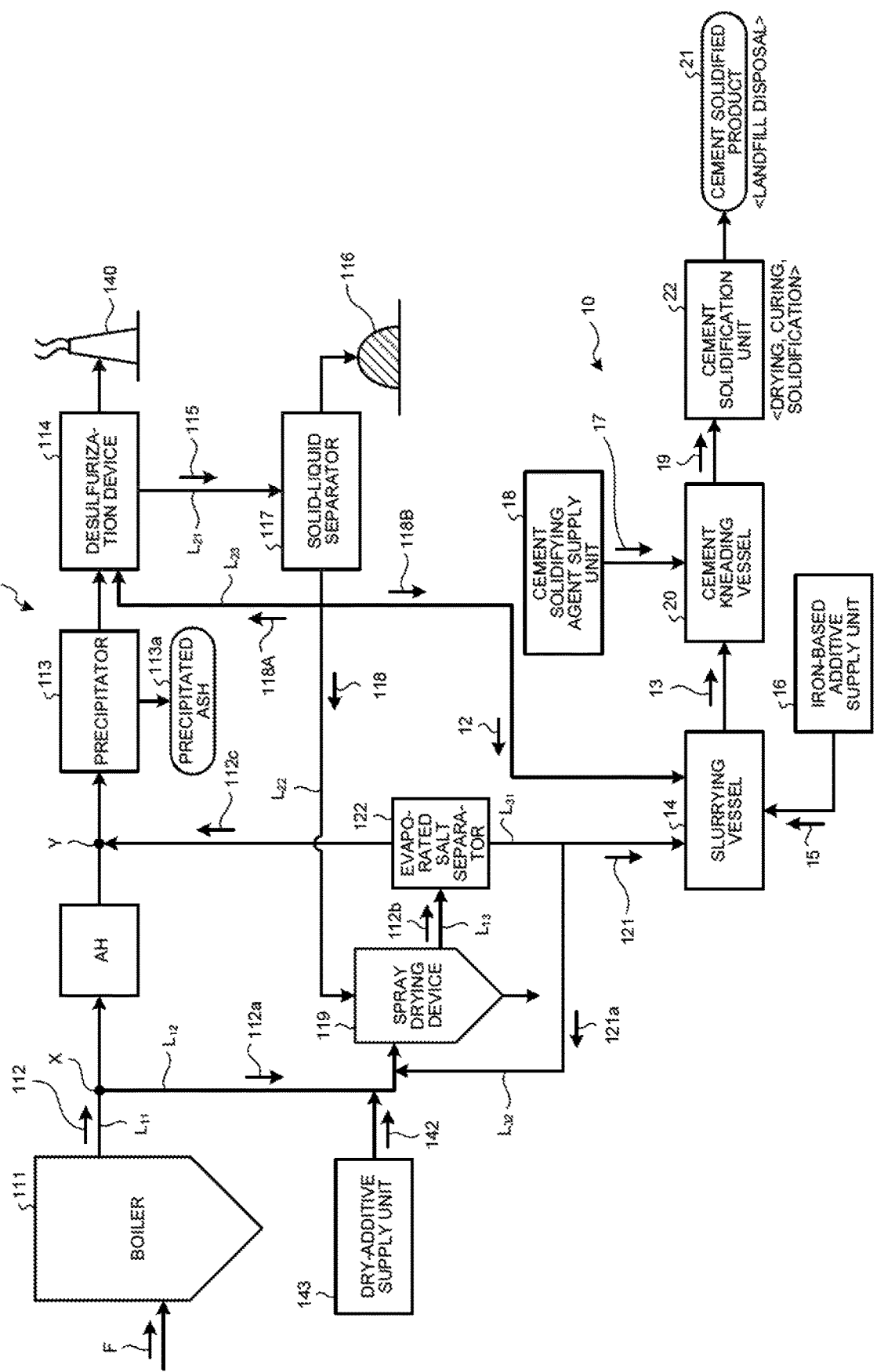
FIG. 10 is a schematic diagram of another zero-liquid discharge air pollution control system in the fifth embodiment.

FIG. 10 is a schematic configuration diagram of another zero-liquid discharge air pollution control system in the fifth embodiment.

In a zero-liquid discharge air pollution control system 100E illustrated in FIG. 10, in the fifth embodiment, after the evaporated salts 121 to which the dry additive 142 is added are separated by the evaporated salt separator 122, via a recycle line $L_{32}$ branching from the evaporated-salt discharge line $L_{31}$ and connecting to the flue-gas introduction line $L_{12}$, a part 121a of the separated evaporated salts 121 containing the dry additive 142 is to be added to the branched gas 112a.

By recycling the part 121a of the evaporated salts 121 containing the dry additive 142 and adding it to the branched gas 112a, the proportion of the solid content in the branched gas 112a is further increased, and thus it is possible to promote the droplet evaporation of the separated water 118 and the solidification of the evaporated salts 121, in spray-drying in the spray drying device 119.

Sixth Embodiment

Figure 11:
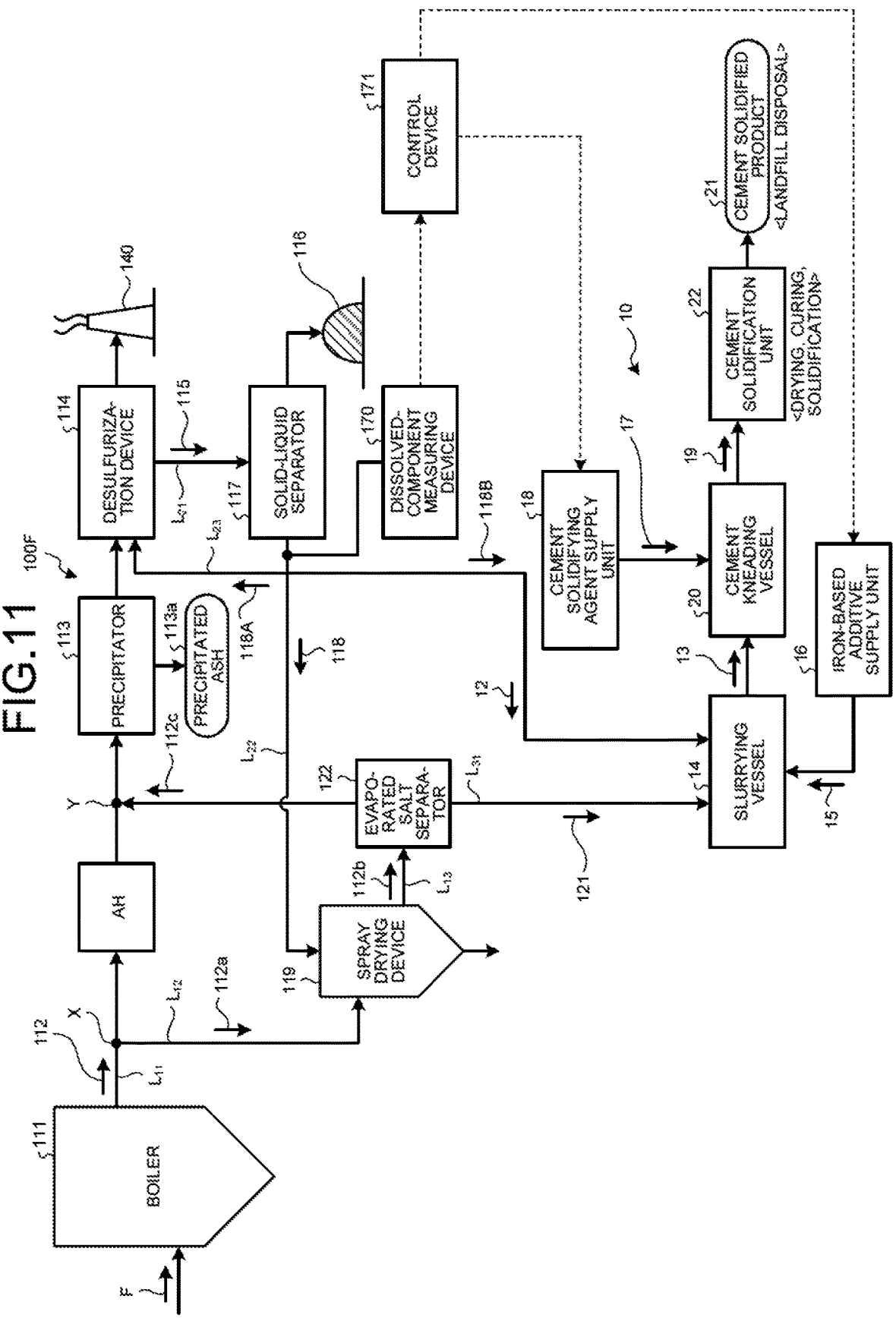
FIG. 11 is a schematic diagram of a zero-liquid discharge air pollution control system according to a sixth embodiment.

FIG. 11 is a schematic configuration diagram of a zero-liquid discharge air pollution control system according to a sixth embodiment. As for the members identical to those in the zero-liquid discharge air pollution control systems in the second and the third embodiments, the identical reference signs will be given to and the descriptions thereof will be omitted. In a zero-liquid discharge air pollution control system 100F in the sixth embodiment illustrated in FIG. 11, in the third embodiment, a dissolved-component measuring device 170 that measures dissolved components in the separated water 118 separated by the solid-liquid separator 117 is provided. Depending on the value of dissolved components measured by the dissolved-component measuring device 170, the addition amount of either one or both of the iron-based additive 15 to be added to the slurrying vessel 14 and the cement solidifying agent 17 to be added to the cement kneading vessel 20 is to be adjusted.

The measurement of the dissolved components in the separated water 118 is carried out periodically or continuously (automated) and the data thereof is stored.

As for the dissolved components in the separated water 118, the subjects of measurement are mercury (Hg), arsenic (As), selenium (Se), boron (B), and others, for example.

It may be configured such that the dissolved-component measuring device 170 periodically or continuously measures the concentration of those dissolved components and stores it as the data and such that, based on the stored data, a control device 171 performs optimal control by calculating the most economical operating condition corresponding to the results of concentration analyses of, for example, selenium (Se) and boron (B) contained in the evaporated salts 121, and adjusting the amount of adding the cement solidifying agent 17, and the compounding ratio of the iron-based additive 15. This control may be performed by an operator or performed automatically. The analysis of the dissolved components can be performed by an atomic absorption measurement device, an ICP emission spectrophotometer, and a known analyzer of an ICP mass spectrometry (ICP-MS) method or the like.

For example, when the fuel type of the fuel F and the operating conditions of the boiler 111 and the precipitator 113 fluctuate, the concentration of, for example, mercury (Hg), arsenic (As), selenium (Se), boron (B), and others also fluctuate greatly, and thus the amount of chemicals needed also fluctuates. For example, when the concentration of mercury (Hg), arsenic (As), and selenium (Se) in the desulfurized effluent greatly fluctuates, there is a possibility of a situation that the addition amount of cement and the addition amount of iron-based chemical agent are excessive or insufficient. Thus, by properly adjusting, in response to the fluctuations of the concentration thereof, the addition amount of cement and the addition amount of iron-based chemical agent, it is possible to eliminate the excessive addition amount or insufficient addition. In particular, because the content of hexavalent selenium in the desulfurized effluent influences the addition amount of cement and the addition amount of iron-based chemical agent, this regular analysis is important. Furthermore, because boron (B) in the desulfurized effluent consumes alkaline components in the cement solidifying agent 17, when the amount of increase or decrease in boron greatly fluctuates, there is a possibility of a situation that the addition amount of the cement solidifying agent 17 is excessive or insufficient, and it is possible to eliminate this. An appropriate amount of the addition amount of cement or the addition amount of iron-based chemical agent, which corresponds to each analysis target component in the desulfurized effluent, is referred to as "feed-forward amount".

Figure 12:
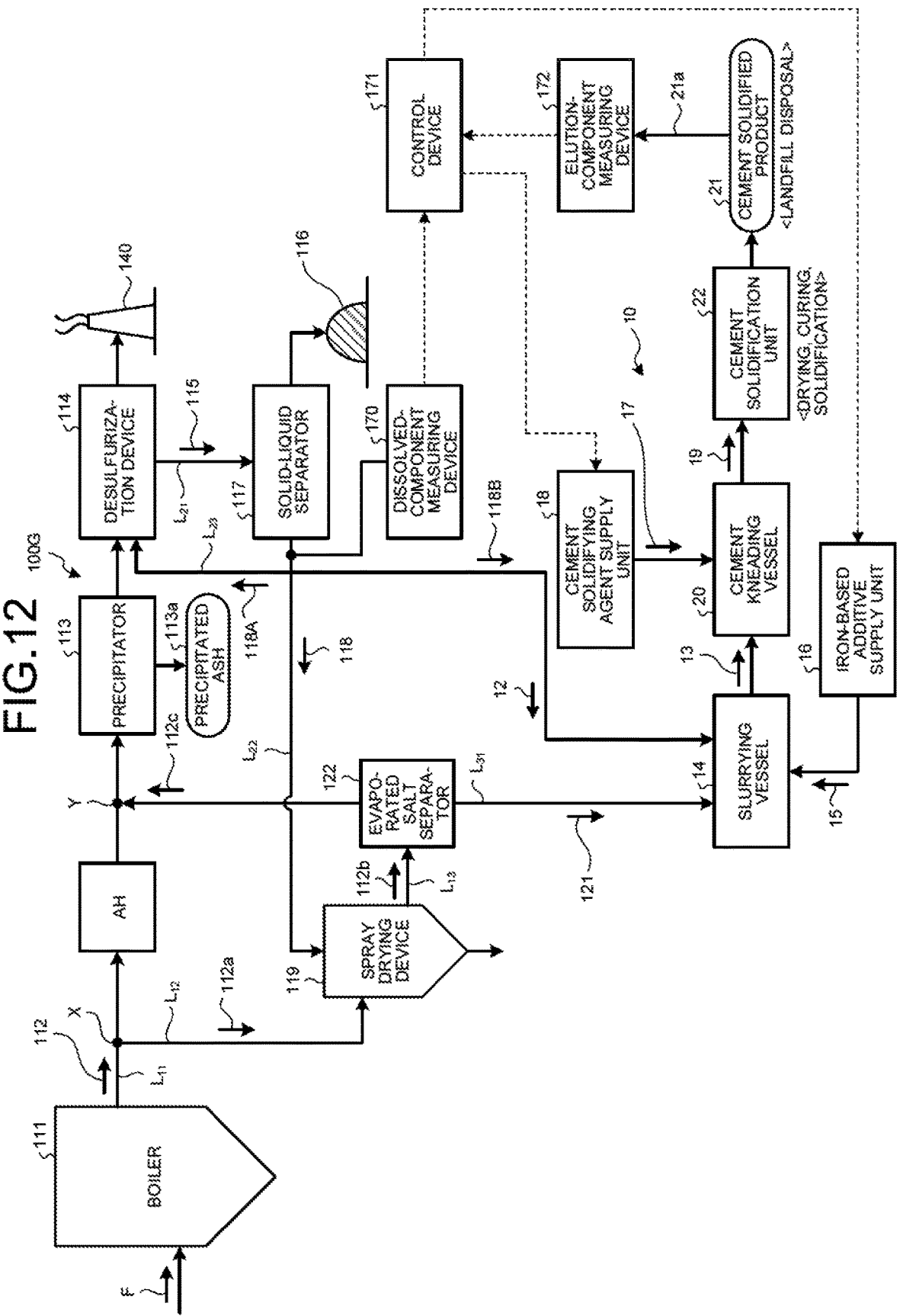
FIG. 12 is a schematic diagram of another zero-liquid discharge air pollution control system in the sixth embodiment.

FIG. 12 is a schematic configuration diagram of another zero-liquid discharge air pollution control system in the sixth embodiment. In a zero-liquid discharge air pollution control system 100G illustrated in FIG. 12, in the third embodiment, by drawing off a certain amount of a part 21a from the cement solidified product 21, the amount of elution may be measured by an elution-component measuring device 172 that measures the elution components in the cement solidified product 21. Then, in the control device 171, from the elution measurement data, while carrying out, with the feed-forward amount by the dissolved component measurement of the desulfurized effluent, the feedback correction of a control difference in the insufficient or excessive addition amount of cement or that of iron-based chemical agent, the addition amount of cement and the addition amount of iron-based chemical agent may be increased or decreased, and thus the operation may be carried out under the economically optimal condition while observing stringent elution standards.

Seventh Embodiment

Figure 13:
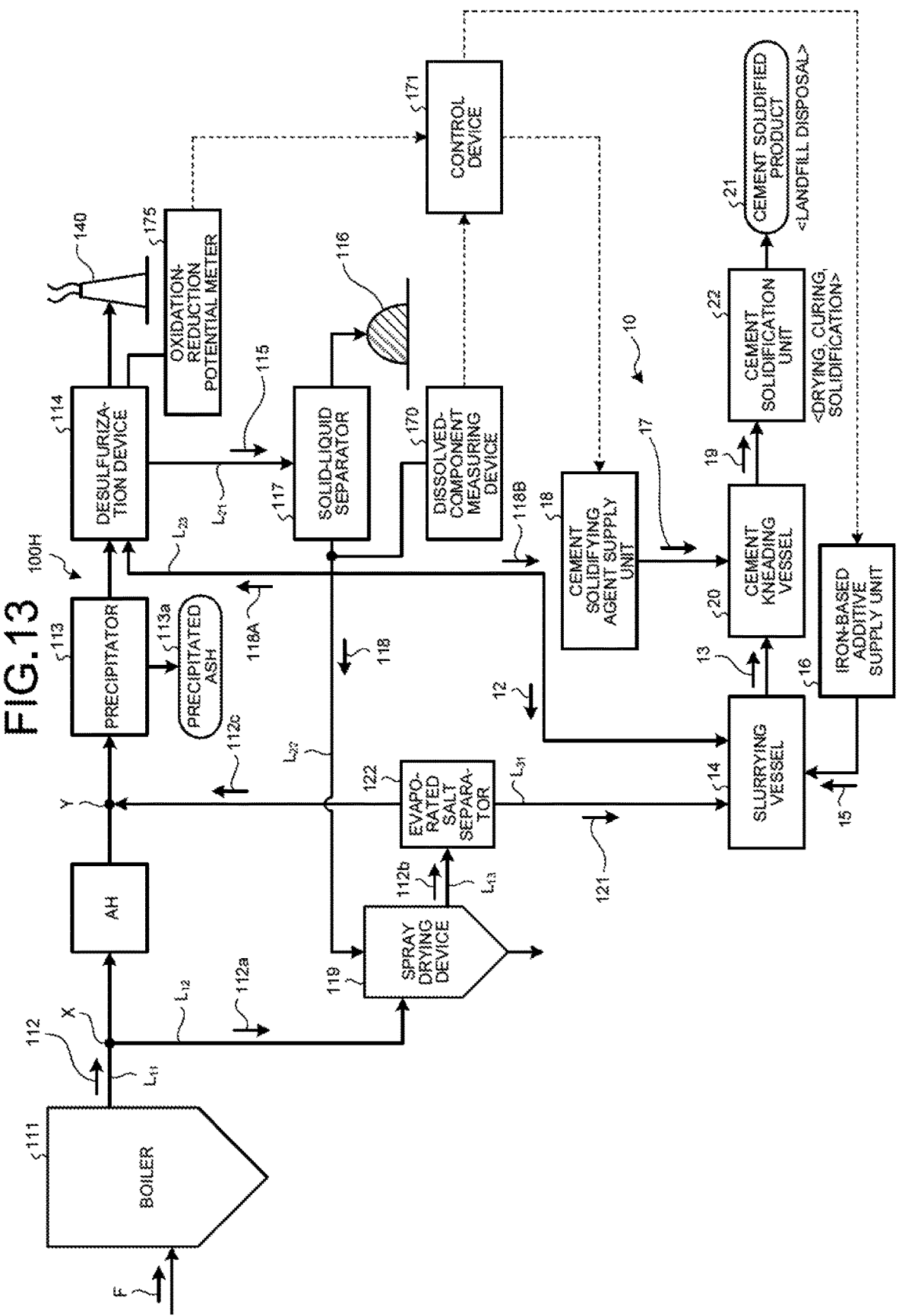
FIG. 13 is a schematic diagram of a zero-liquid discharge air pollution control system according to a seventh embodiment.

FIG. 13 is a schematic configuration diagram of a zero-liquid discharge air pollution control system according to a seventh embodiment. As for the members identical to those in the zero-liquid discharge air pollution control systems in the second and the third embodiments, the identical reference signs will be given to and the descriptions thereof will be omitted. In a zero-liquid discharge air pollution control system 100H in the seventh embodiment illustrated in FIG. 13, an oxidation-reduction potential meter 175 that measures an oxidation-reduction potential value of the desulfurization absorbent of the desulfurization device 114 is provided. By using the oxidation-reduction potential meter 175, the oxidation-reduction potential in the desulfurization absorbent is adjusted to be in a range of 100 to 200 mV.

By measuring the oxidation-reduction potential (ORP, hereinafter also referred to as "ORP") of the desulfurization absorbent by the oxidation-reduction potential meter 175 and adjusting it so as to be in the range of 100 to 200 mV, the oxidation of tetravalent selenium, which is present in the desulfurization absorbent, into hexavalent selenium is suppressed. That is, by supplying tetravalent selenium, which is relatively easy to shift to a solid phase as compared with hexavalent selenium that is persistent and is very hard to prevent elution, from the desulfurized effluent to the spray drying device before oxidizing into hexavalent selenium, it is possible to suppress the elution concentration of selenium and to lead to the reduction of the addition amount of cement and the addition amount of iron-based chemical agent as a result.

Particularly, in a plant in which the boiler 111 combusts low S content fuel, high heavy metal containing fuel, and others, and in a plant in which limestone as the desulfurization raw material contains a large amount of manganese (Mn), it is expected that it is more likely to be in a state of a high ORP. In that case, for example, by adding a reducing additive and making the ORP value be in the above-described proper range, it is possible to suppress the generation of hexavalent selenium. Accordingly, it is possible to reduce the rate of persistent hexavalent selenium in the evaporated salts 121.

In the zero-liquid discharge air pollution control systems 100C to 100H in the fourth to seventh embodiments, as in the zero-liquid discharge air pollution control system 100B in the third embodiment, the slurrying treatment is carried out with the part 118B of the separated water 118 as the solvent water. However, the present invention is not limited thereto, and the slurrying treatment may be carried out by separately supplying the solvent water 12 to the slurrying vessel 14 from the outside.

Furthermore, the slurrying treatment may be carried out by appropriately combining the configurations of the zero-liquid discharge air pollution control systems 100C to 100H in the fourth to seventh embodiments.

REFERENCE SIGNS LIST

10 CEMENT SOLIDIFICATION DEVICE
11 WASTE CONTAINING HARMFUL SUBSTANCES AND DELIQUESCENT COMPOUNDS (WASTE)
12 SOLVENT WATER
13 SLURRIED MATERIAL
14 SLURRYING VESSEL
15 IRON-BASED ADDITIVE
16 IRON-BASED ADDITIVE SUPPLY UNIT
17 CEMENT SOLIDIFYING AGENT
18 CEMENT-SOLIDIFYING AGENT SUPPLY UNIT
19 CEMENT KNEADED PRODUCT
20 CEMENT KNEADING VESSEL
21 CEMENT SOLIDIFIED PRODUCT
22 CEMENT SOLIDIFICATION UNIT
100A to 100H ZERO-LIQUID DISCHARGE AIR POLLUTION CONTROL SYSTEM
111 BOILER
112 BOILER FLUE GAS
113 PRECIPITATOR
114 DESULFURIZATION DEVICE
115 DESULFURIZED EFFLUENT
116 SOLID MATERIAL
117 SOLID-LIQUID SEPARATOR
118 SEPARATED WATER
119 SPRAY DRYING DEVICE
121 EVAPORATED SALTS CONTAINING HARMFUL SUBSTANCES AND DELIQUESCENT COMPOUNDS (EVAPORATED SALTS)
122 EVAPORATED SALT SEPARATOR

The invention claimed is:
1. A zero-liquid discharge air pollution control system, comprising:
a boiler that combusts fuel;
a heat recovery device that is provided on a main flue gas duct discharging a boiler flue gas from the boiler and is configured to recover heat of the boiler flue gas;
a precipitator that is configured to remove soot dust in the boiler flue gas after the heat recovery device;
a desulfurization device that is configured to remove sulfur oxides contained in the boiler flue gas after the precipitator with a desulfurization absorbent;
a solid-liquid separator that is configured to remove solid material from desulfurized effluent discharged from the desulfurization device;
a spray drying device that is configured to spray separated water from the solid-liquid separator;
a gas introduction line that is configured to introduce into the spray drying device a drying gas for evaporating and drying the separated water;
a discharged-gas supply line that is configured to return to the main flue gas duct a discharged gas after evaporating and drying the separated water by the spray drying device;
an evaporated salt separator that is provided on the discharged-gas supply line and is configured to separate an evaporated salt containing harmful substances and deliquescent compounds in the discharged gas;
a slurrying vessel that is configured to dissolve and slurry the evaporated salt in solvent water to obtain slurried material;

an evaporated salt discharge line that is configured to supply the evaporated salt from the evaporated salt separator to the slurrying vessel;

a cement kneading vessel that is provided on a downstream side of the slurrying vessel and is configured to add a cement solidifying agent to the slurried material introduced from the slurrying vessel and to knead the resulted material to obtain a cement kneaded product;

an iron-based additive supply unit that is connected to either or both of the slurrying vessel and the cement kneading vessel and is configured to add an iron-based additive to either one or both of the slurried material in the slurrying vessel and the cement kneaded product in the cement kneading vessel; and a cement solidification unit that is provided on a downstream side of the cement kneading vessel and is configured to cure the cement kneaded product introduced from the cement kneading vessel to form a cement solidified product having a compressive strength of 200 kg/cm$^2$ or greater.

2. The cement solidification device for waste according to claim 1, wherein the iron-based additive is an inorganic ferrous salt.

3. The zero-liquid discharge air pollution control system according to claim 1, wherein the solvent water is a part of the separated water that has been separated by the solid-liquid separator.

4. The zero-liquid discharge air pollution control system according to claim 1, wherein fly ash is added to the cement kneading vessel together with the cement solidifying agent.

5. The zero-liquid discharge air pollution control system according to claim 1, wherein a dry additive is added to a branched gas.

6. The zero-liquid discharge air pollution control system according to claim 5, wherein after an evaporated salt to which the dry additive is added is separated by the evaporated salt separator, a part of the evaporated salt is added to the branched gas.

7. The zero-liquid discharge air pollution control system according to claim 1, further comprising:
a dissolved-component measuring device that measures dissolved components in the separated water that has been separated by the solid-liquid separator, wherein
an addition amount of either one or both of the iron-based additive and the cement solidifying agent is adjusted, depending on a value of the measured dissolved components.

8. The zero-liquid discharge air pollution control system according to claim 7, further comprising:
an elution-component measuring device that measures elution components in the cement solidified product, wherein
an addition amount of either one or both of the iron-based additive and the cement solidifying agent is adjusted depending on a value of the measured elution components.

9. The zero-liquid discharge air pollution control system according to claim 1, further comprising:
an oxidation-reduction potential meter that measures an oxidation-reduction potential value of the desulfurization absorbent in the desulfurization device, wherein an oxidation-reduction potential is adjusted to a range of 100 to 200 mV.

10. A zero-liquid discharge air pollution control method including recovering heat of a boiler flue gas from a boiler, removing sulfur oxides contained in the boiler flue gas with a desulfurization absorbent, removing solid material from desulfurized effluent discharged at the removing of sulfur oxides, and spraying separated water that has been separated at the removing of the solid material and evaporating and drying the separated water with a drying gas, the zero-liquid discharge air pollution control method comprising:
separating, into solid and gas, an evaporated salt containing harmful substances and deliquescent compounds in discharged gas after the spraying and the drying;
dissolving and slurrying waste that contains heavy metals and deliquescent compounds in solvent water, optionally with an iron-based additive, to obtain slurried material;
adding a cement solidifying agent to the slurried material, optionally with an iron-based additive, followed by kneading to obtain a cement kneaded product containing iron-based material; and
curing the cement kneaded product to form a cement solidified product having a compressive strength of 200 kg/cm$^2$ or greater,
wherein the waste is evaporated waste.

11. The zero-liquid discharge air pollution control method according to claim 10, wherein the solvent water is a part of the separated water that has been separated from the desulfurized effluent.

12. The zero-liquid discharge air pollution control method according to claim 10, wherein fly ash is added together with the cement solidifying agent to obtain the cement kneaded product.

13. The zero-liquid discharge air pollution control method according to claim 10, wherein a dry additive is added to a branched gas.

14. The zero-liquid discharge air pollution control method according to claim 13, wherein after an evaporated salt to which the dry additive is added is separated by the evaporated salt separator, a part of the evaporated salt is added to the branched gas.

15. The zero-liquid discharge air pollution control method according to claim 10, wherein dissolved components in the separated water that has been separated by the solid-liquid separator are measured, and an addition amount of either one or both of the iron-based additive and the cement solidifying agent is adjusted depending on a value of the measured dissolved components.

16. The zero-liquid discharge air pollution control method according to claim 15, wherein elution components in the cement solidified product are measured, and an addition amount of either one or both of the iron-based additive and the cement solidifying agent is adjusted depending on a value of the measured elution components.

17. The zero-liquid discharge air pollution control method according to claim 10, wherein an oxidation-reduction potential value of the desulfurization absorbent in the desulfurization device is measured, and the oxidation-reduction potential is adjusted to a range of 100 to 200 mV.

* * * * *